US011714054B2

(12) United States Patent
Kirschenman

(10) Patent No.: US 11,714,054 B2
(45) Date of Patent: *Aug. 1, 2023

(54) INLINE X-RAY MEASUREMENT APPARATUS AND METHOD

(71) Applicant: Illinois Tool Works Inc., Glenview, IL (US)

(72) Inventor: Mark B. Kirschenman, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 319 days.

This patent is subject to a terminal disclaimer.

(21) Appl. No.: 17/020,267

(22) Filed: Sep. 14, 2020

(65) Prior Publication Data

US 2020/0408705 A1    Dec. 31, 2020

Related U.S. Application Data

(63) Continuation of application No. 15/740,369, filed as application No. PCT/US2016/036922 on Jun. 10, 2016, now Pat. No. 10,803,574.

(Continued)

(51) Int. Cl.
*G01N 23/18* (2018.01)
*G01N 23/046* (2018.01)
(Continued)

(52) U.S. Cl.
CPC .......... *G01N 23/18* (2013.01); *G01N 23/046* (2013.01); *G01N 23/083* (2013.01);
(Continued)

(58) Field of Classification Search
CPC .... G01N 23/18; G01N 23/046; G01N 23/083; G01N 23/223; G01N 2223/321;
(Continued)

(56) References Cited

U.S. PATENT DOCUMENTS

| 4,803,639 A | * | 2/1989 | Steele | ............... G06T 7/0004 378/58 |
| 5,615,244 A | | 5/1997 | Dykster et al. | |

(Continued)

FOREIGN PATENT DOCUMENTS

| CN | 103794258 | 5/2014 |
| CN | 104459756 | 3/2015 |

(Continued)

OTHER PUBLICATIONS

Office Action, and translation thereof, from counterpart Korean Application No. 10-2018-7002851 dated Aug. 7, 2022, 8 pp.

(Continued)

*Primary Examiner* — Christine S. Kim
(74) *Attorney, Agent, or Firm* — Shumaker & Sieffert, P.A.

(57) ABSTRACT

An x-ray inspection apparatus may comprise an x-ray source, an x-ray detector, and a drive assembly. The drive assembly may be configured to lift a part carrier such that the part carrier is disengaged from a feed assembly and an object mounted on the part carrier is positioned between the x-ray source and the x-ray detector. The feed assembly may be configured to feed part carriers into and out of the x-ray inspection apparatus. The drive assembly may be further configured to subsequently lower the part carrier such that the part carrier is reengaged with the feed assembly.

16 Claims, 21 Drawing Sheets

Related U.S. Application Data

(60) Provisional application No. 62/186,792, filed on Jun. 30, 2015.

(51) Int. Cl.
*G01N 23/083* (2018.01)
*G01N 23/223* (2006.01)
*G06T 7/00* (2017.01)

(52) U.S. Cl.
CPC ......... *G01N 23/223* (2013.01); *G06T 7/0004* (2013.01); *G01N 2223/321* (2013.01); *G01N 2223/419* (2013.01); *G01N 2223/643* (2013.01); *G01N 2223/645* (2013.01)

(58) Field of Classification Search
CPC ....... G01N 2223/419; G01N 2223/643; G01N 2223/645; G06T 7/0004
See application file for complete search history.

(56) References Cited

U.S. PATENT DOCUMENTS

| | | | |
|---|---|---|---|
| 6,408,045 B1* | 6/2002 | Matsui | G03F 7/709 378/204 |
| 2003/0053589 A1 | 3/2003 | Ikeshita et al. | |
| 2004/0008814 A1 | 1/2004 | Shafer | |
| 2010/0246930 A1 | 9/2010 | Dekker et al. | |
| 2011/0051996 A1 | 3/2011 | Gudmundson et al. | |
| 2012/0155606 A1* | 6/2012 | Simon | C04B 35/522 378/19 |
| 2014/0376692 A1 | 12/2014 | Schafer et al. | |
| 2015/0298845 A1 | 10/2015 | Schmid et al. | |
| 2016/0033404 A1 | 2/2016 | Suzuki et al. | |
| 2018/0001565 A1 | 1/2018 | Hocker | |
| 2018/0122526 A1 | 5/2018 | Omori et al. | |
| 2018/0189944 A1 | 7/2018 | Kirschenman | |
| 2018/0313772 A1 | 11/2018 | Yaegashi et al. | |
| 2019/0154599 A1 | 5/2019 | Kaminski et al. | |

FOREIGN PATENT DOCUMENTS

| | | | |
|---|---|---|---|
| DE | 102011110109 A1 | 2/2013 | |
| DE | 202012101669 U1 | 10/2013 | |
| EP | 497406 A1 * | 8/1992 | .............. G01L 1/25 |
| EP | 2654393 A2 | 10/2013 | |
| JP | S62249040 | 10/1987 | |
| JP | 200074856 A | 3/2000 | |
| JP | 2009139230 | 6/2009 | |
| JP | 2012225666 | 11/2012 | |
| JP | 3204651 U * | 6/2016 | |
| WO | 2014082634 | 6/2014 | |

OTHER PUBLICATIONS

"GE Introduces New In-Line CT Concept and nanoCT System at GIFA," GE Sensing & Inspection Technologies GmbH, Issue: 2011-08, accessed from http://www.ndt.net/search/docs.php3?id=11021&content=1.

"Inline computed tomgraphy," Fraunhofer IIS, accessed from http://www.iis.fraunhofer.de/en/ff/zfp/tech/computertomographie/inline-computertomographie.html, on Dec. 27, 2017, 3 pp.

"Vollautomatische CT-Prufanlange HeiDetect XS CT," accessed from http://www.erhardt-abt.de/heidetect-xs-ct.html, on Dec. 27, 2017, 2 pp.

International Preliminary Report on Patentability from International Application No. PCT/US2016/036922, dated Jan. 2, 2018, 11 pp.

International Search Report and Written Opinion from International Application No. PCT/US2016/036922, dated Oct. 19, 2016, 16 pp.

Office Action from counterpart Canadian Application No. 2,991,030 dated Jul. 29, 2019, 5 pp.

Translation of Reasons of Refusal, from counterpart Japanese Application No. 2017-568283, dated Jan. 16, 2020, 5 pp.

Written Amendment, and translation thereof, from counterpart Japanese Application No. 2017-568283, filed Jan. 8, 2016, 9 pp.

Prosecution History from U.S. Appl. No. 15/740,369, dated Nov. 18, 2019 through Jun. 12, 2020, 33 pp.

* cited by examiner

CT ROTATION DRIVE (EXTENDED)

CT ROTATION DRIVE (RETRACTED)

INLINE X-RAY MEASUREMENT APPARATUS AND METHOD

This application is a continuation of U.S. patent application Ser. No. 15/740,369, filed Jun. 10, 2016, which is a 35 U.S.C. § 371 application from PCT Application PCT/US2016/036922, filed Jun. 10, 2016, which claims the benefit of U.S. Provisional Patent Application 62/186,792, filed Jun. 30, 2015, the entire content of which is incorporated herein by reference.

TECHNICAL FIELD

This disclosure relates to x-ray inspection of objects.

BACKGROUND

X-ray computed tomography (CT) is a procedure that uses computer-processed x-rays to produce tomographic images of an object. A tomographic image of an object is an image of a conceptually two-dimensional "slice" of the object. A computing device may use the tomographic images of the object to generate a 3-dimensional image of the object. X-ray CT may be used for industrial purposes to conduct non-destructive evaluation of objects. X-ray metrology is a related technique in which x-rays are used to measure internal and external dimensions of objects under test.

SUMMARY

In general, this disclosure describes x-ray inspection apparatuses, systems, and methods for x-ray inspection of parts or other objects in production environments, or other types of environments.

In one example, this disclosure describes an x-ray inspection apparatus comprising an x-ray source, an x-ray detector, and a drive assembly (i.e., a drive mechanism). The drive assembly is configured to lift a part carrier such that the part carrier is disengaged from a feed assembly and an object mounted on the part carrier is positioned between the x-ray source and the x-ray detector. The feed assembly is configured to feed part carriers into and out of the x-ray inspection apparatus. The drive assembly is further configured to subsequently lower the part carrier such that the part carrier is reengaged with the feed assembly.

In another example, this disclosure describes a method comprising: lifting a part carrier such that the part carrier is disengaged from a feed assembly and an object mounted on the part carrier is positioned between an x-ray source and an x-ray detector, wherein the feed assembly is configured to feed part carriers into and out of a x-ray inspection apparatus comprising the x-ray source and the x-ray detector; and subsequently lowering the part carrier such that the part carrier is reengaged with the feed assembly.

In another example, this disclosure describes an x-ray inspection apparatus comprising: an x-ray source, an x-ray detector, a robotic feed assembly, a radiological shield enclosing the x-ray source, the x-ray detector, and the robotic feed assembly. In this example, the radiological shield defines an opening. The apparatus further comprises a door configured to selectively cover and uncover the opening. In this example, the robotic feed assembly is configured to: move a part carrier from a feed assembly, through the opening, and to a position between the x-ray source and the x-ray detector, wherein an object to be inspected is mounted on the part carrier. The robotic feed assembly is configured to subsequently move the part carrier back through the opening to the feed assembly.

In another example, this disclosure describes a method comprising: moving, by a robotic feed assembly enclosed within a radiological shield defining an opening, a part carrier from a feed assembly, through the opening, and to a position between an x-ray source enclosed within the radiological shield and an x-ray detector enclosed within the radiological shield, wherein an object to be inspected is mounted on the part carrier; and subsequently moving, by the robotic feed assembly, the part carrier back through the opening to the feed assembly.

The details of one or more examples are set forth in the accompanying drawings and the description below. Other features, objects, and advantages will be apparent from the description, drawings, and claims.

DETAILED DESCRIPTION

Figure 1:
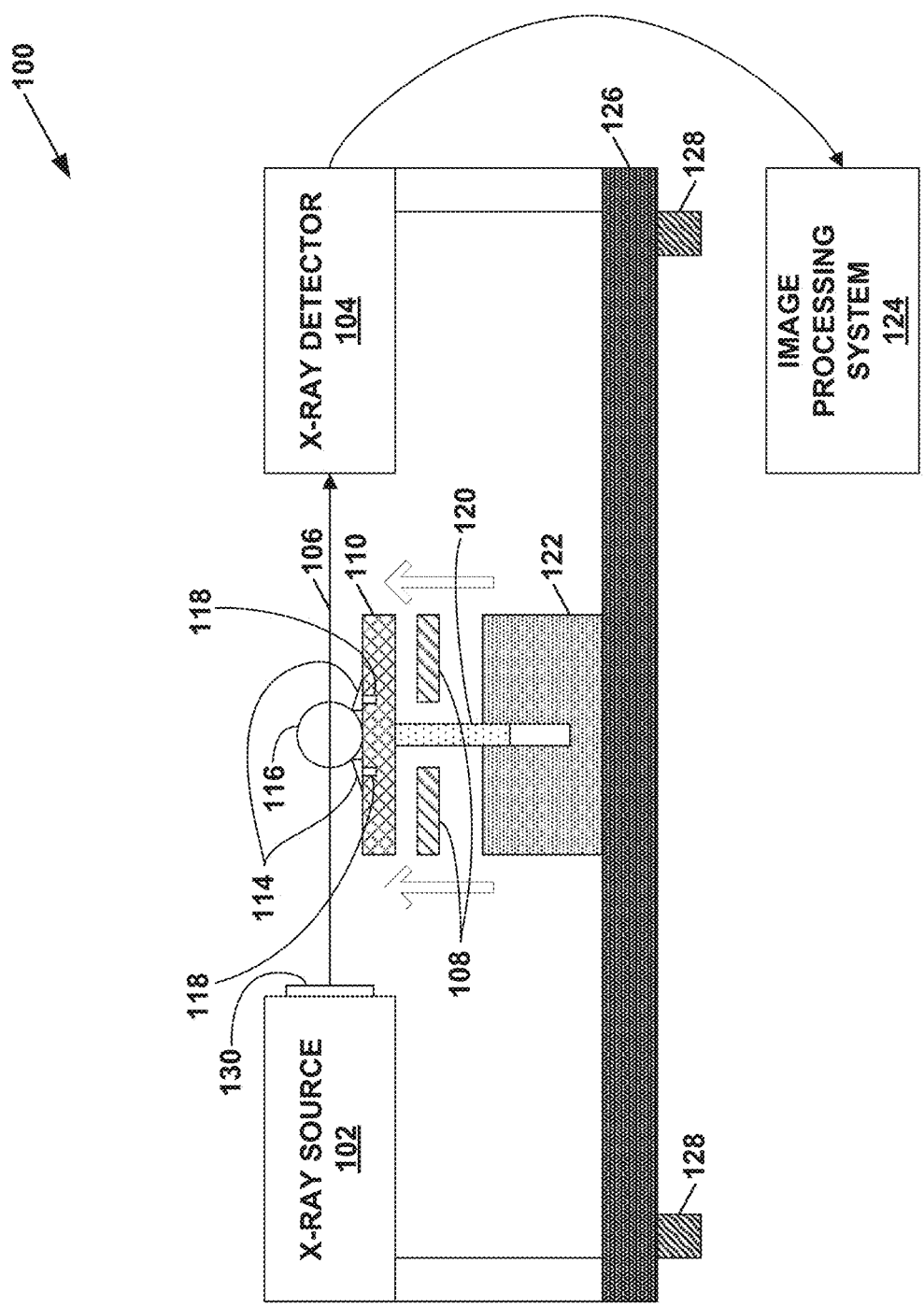
FIG. 1 is a block diagram illustrating an example x-ray inspection apparatus that may perform one or more techniques of this disclosure.

FIG. 1 is a block diagram illustrating an example x-ray inspection apparatus 100 that may perform one or more techniques of this disclosure. An x-ray inspection apparatus may be also be referred to as an x-ray imaging apparatus. In the example of FIG. 1, apparatus 100 includes an x-ray source 102 and an x-ray detector 104. Apparatus 100 may be referred to as an "inline" x-ray inspection apparatus because apparatus 100 may inspect a flow of products in a production environment, as opposed to a "per part" basis as done in some systems. That is, apparatus 100 may implement an inline system for continuous x-ray inspection of parts in a production environment. Such x-ray inspection can be computed tomography (CT), digital radiography (DR), automatic defect recognition (ADR), or other types of inspection.

When in operation, x-ray source 102 emits an x-ray beam 106. Hence, in some instances, this disclosure may refer to x-ray source 102 or similar devices as "x-ray generators." In some examples, x-ray beam 106 is cone-shaped. In other examples, x-ray beam 106 is fan-shaped. Furthermore, in some examples, x-ray source 102 generates x-rays with an energy range of 20 keV to 600 keV. In other examples, x-ray source 102 generates x-rays in other energy ranges.

Apparatus 100 may include various types of x-ray detectors. For example, x-ray detector 104 may include a flat panel x-ray detector (FPD). In other examples, x-ray detector 104 may include a lens-coupled scintillation detector, a linear diode array (LDA), or another type of x-ray detector. A FPD may include a layer of scintillation material, such as Cesium Iodide fabricated on amorphous silicon on a glass detector array. The scintillator layer absorbs x-rays and emits visible light photons that are, in turn, detected by a solid state detector. The detector pixel size may range from tens to hundreds of micrometers. In some examples where x-ray detector 104 comprises a flat-panel x-ray detector, the pixel size of x-ray detector 104 may be in the range of 25 micrometers to 250 micrometers. In some examples, the pixel size of x-ray detector 104 may be in the range of approximately 25 micrometers to approximately 250 micrometers. Furthermore, the field of view of common commercial FPDs may range from approximately 100 mm to 500 mm. Commercial FPDs may be used in applications requiring large fields of view.

High-resolution applications may use lens-coupled detectors that use an optical lens to relay emitted visible light to a detector, such as a charge-coupled device (CCD) or a complementary metal-oxide-semiconductor (CMOS) detector. In some examples, the lens may provide magnification in the range of 1× to 100×, thus making the effective pixel size between 0.1 to 20 micrometers. In some examples where x-ray detector 104 comprises a lens-coupled detector, the pixel size of x-ray detector 104 is in a range of 0.1 micrometers to 10 micrometers. Furthermore, in some examples where x-ray detector 104 comprises a lens-coupled detector, the field of view may range from 0.2 mm to 25 mm.

In addition to x-ray source 102 and x-ray detector 104, apparatus 100 comprises a feed assembly. Because of the perspective of FIG. 1, the feed assembly is not wholly visible. The feed assembly conveys part carriers, such as part carrier 110, into and out of an inspection area of apparatus 100. The feed assembly may be implemented in various ways. For example, the feed assembly may be implemented using a ring drive (such as that shown in FIG. 16, which is discussed in detail below), a serpentine track (such as that shown in FIG. 5, which is discussed in detail below), a perforated conveyor belt, a chain drive, or another type of assembly for moving one or more part carriers into and out of the inspection area of apparatus 100. This disclosure may also refer to part carriers as "carrier platens."

In the example of FIG. 1, the feed assembly conveys part carriers in a direction into and out of the page. Hence, the feed assembly is omitted from FIG. 1. However, FIG. 1 does show two carrier support members 108 of the feed assembly, one on either side of part carrier 110. However, in other examples, carrier support members 108 are differently aligned or disposed.

A part carrier is an object designed for supporting objects (e.g., parts) to be inspected by apparatus 100. In several figures of this disclosure, part carriers are shown as being disc-shaped. However, in other examples, part carriers may have different shapes, such as squares, rectangles, ovals, or other shapes. Furthermore, throughout the figures of this disclosure, part carriers are shown as having flat top surfaces. However, in other examples, part carriers may have differently formed top surfaces. For instance, part carriers may be convex, concave, beveled, or have raised outer edges.

In some examples, part support members are mounted on part carriers. In some examples, part support members are formed on part carriers. Part support members are designed to support particular types of objects to be inspected by apparatus 100. Part support members may be designed to hold an object at a constant position relative to a part carrier. Part support members may be specifically formed to support particular types of objects. Part support members may be formed from a material substantially transparent to x-rays, such that part support members do not give rise, in radiographs, to artifacts that disrupt the inspection process being performed.

In the example of FIG. 1, part support members 114 support an object 116. Furthermore, in the example of FIG. 1, part support members 114 are triangular shaped objects. However, part support members may have a wide variety of shapes specifically created for holding particular types of objects. For instance, part support members may be ring-shaped, may comprise a set of prongs, and so on. In the example of FIG. 1, object 116 is spherical. However, in other examples, object 116 may be a wide variety of items, such as artificial heart valves and other medical devices, electronic components, and so on.

Because part support members 114 may be specifically created for holding particular types of objects, part carriers may be formed in such a way that variously shaped part support members may be mounted on the part carriers. For example, a part carrier may be formed to define a set of holes. In this example, part support members may have engagement members formed to fit into one or more of the holes. For instance, in the example of FIG. 1, part support members 114 have peg-shaped engagement members 118 that engage holes defined in an upper surface of part carrier 110.

In some examples, part carriers and part support members comprise magnets and/or have magnetic properties. As such, part support members may be mounted on and held in place on part carriers using magnetic fixturing. In other words, magnetic fields hold part support members in place on part carriers. In this way, a part carrier may include magnets arranged to mount a part support member to the part carrier, the part support member configured to support an object for inspection. Thus, it may be unnecessary for part support members 114 to have engagement members 118 as shown in the example of FIG. 1 or for part carriers to define holes for accepting engagement members of part support members. In some such examples, part carriers may comprise 400 series stainless steel tops to allow for magnetic fixturing.

In some examples, part support members are detachable from part carriers. Thus, with different part support members mounted on part carriers, the part carriers may be reused for different types of objects to be inspected. Thus, part carriers do not need to be specialized for particular types of objects. Thus, special tooling required for inspection of different parts may be minimized or eliminated. In some examples, apparatus 100, as a whole, may provide a "neutral" means to pass parts through the system without internal equipment tooling changes.

In the example of FIG. 1, when the feed assembly conveys a part carrier to the inspection area of apparatus 100, the feed assembly positions part carrier 110 directly above a lift member 120 of a drive assembly 122. In the example of FIG. 1, drive assembly 122 raises lift member 120 such that lift member 120 engages a lower surface of part carrier 110 and lifts part carrier 110 off carrier support members 108 of the feed assembly, as indicated by the vertical arrows. In this way, drive assembly 122 may vertically position object 116 into an elevated inspection area between x-ray source 102 and x-ray detector 104.

Thus, apparatus 100 may comprise x-ray source 102, x-ray detector 104, and drive assembly 122. Drive assembly 122 may be configured to lift a part carrier such that the part carrier is disengaged from a feed assembly and an object mounted on the part carrier is positioned between x-ray source 102 and x-ray detector 104. The part carrier is configured to feed part carriers into and out of the x-ray inspection apparatus 100. Drive assembly 122 is further configured to subsequently lower the part carrier such that the part carrier is reengaged with the feed assembly.

When object 116 is in the elevated inspection area, as shown in FIG. 1, x-ray detector 104 may detect x-rays generated by x-ray source 102 that pass through object 116. An image processing system 124 processes signals (e.g., electrical signals, optical signals, etc.) corresponding to the detected x-rays to generate radiographs of object 116. Image processing system 124 may include one or more computing devices.

Furthermore, when object 116 is in the elevated inspection area, drive assembly 122 may rotate lift member 120, and in doing so, drive assembly 122 may lift part carrier 110 and object 116. Hence, drive assembly 122 may be configured to rotate part carrier 110 while part carrier 110 is disengaged from the feed assembly. This may enable image processing system 124 to generate radiographs of object 116 from multiple rotation angles. In some examples, image processing system 124 processes the radiographs according to a process known as computed tomography (CT) to generate a 3-dimensional (3D) image of object 116. Furthermore, in some examples, image processing system 124 employs CT-based metrology inspection (e.g., dimensional inspection).

In some examples, drive assembly 122 raises and rotates lift member 120 such that apparatus 100 is able to generate radiographs of object 116 has various angles and elevations in accordance with a technique called "helical computed tomography." In such examples, a ray from x-ray source 102 may trace a helical pattern on object 116 as drive assembly 122 raises and rotates object 116. Helical computed tomography may be useful for inspecting elongated objects.

After apparatus 100 has captured sufficient radiographs of object 116, drive assembly 122 may lower lift member 120 such that part carrier 110 again rests on carrier support members 108 of the feed assembly and lift member 120 disengages from part carrier 110. After lift member 120 disengages from part carrier 110, the feed assembly may remove part carrier 110 from the inspection area of apparatus 100 and bring another part carrier into the inspection area of apparatus 100.

In the example of FIG. 1, x-ray source 102, x-ray detector 104, and drive assembly 122 are mounted to a base 126. In some examples, base 126 is a solid, heavy material, such as granite. Moreover, in the example of FIG. 1, base 126 rests on vibration isolators 128. Vibration isolators 128 may include or be made of various vibration dampening materials, such as rubbers, gels, and so on. Vibration isolators 128, plus the weight of base 126, may serve to isolate x-ray source 102, x-ray detector 104, and drive assembly 122 from external vibration. In some examples, no part of the feed assembly is in direct contact with base 126 or any component mounted to base 126. Thus, x-ray source 102 and x-ray detector 104 may be vibrationally isolated from the feed assembly. Furthermore, when lift member 120 lifts part carrier 110 off carrier support members 108 of the feed assembly, part carrier 110 and hence object 116 are vibrationally isolated from the feed assembly. Thus, x-ray source 102, x-ray detector 104, and drive assembly 122 (e.g., CT rotation stage) are all mechanically attached together in a single assembly which is vibration isolated from the rest of the system and the outside world. Such vibrational isolation may prevent artifacts in radiographs resulting from vibrations.

In some examples, x-ray source 102 may remain powered and may continue generating x-rays even when apparatus is not generating radiographs of objects. For instance, x-ray source 102 may continue generating x-rays while the feed assembly is conveying part carriers into and out of an inspection area of apparatus 100. Keeping x-ray source 102 powered on in this fashion may help ensure x-rays generated by x-ray source 102 have a consistent energy level and may reduce costs of operating and/or maintaining apparatus 100. However, leaving x-ray source 102 powered up may present a safety hazard to operators and adjacent personnel if x-ray source 102 remains powered up as parts are moved into and out of the inspection area.

As described elsewhere in this disclosure, a radiological shield (not shown in FIG. 1) of apparatus 100 may be shaped to substantially prevent emission (e.g., emission at levels potentially harmful to humans) of x-rays into an environment outside x-ray inspection apparatus 100. For instance, shielding along a curved flow path may allow apparatus 100 to remain open while the x-ray beam is on, potentially allowing x-ray source 102 to safely remain energized for extended periods of time, providing for greater stability. Thus, apparatus 100 may a provide solution for the problem of leaving x-ray source 102 powered on while allowing parts to pass into and out of the protective radiographic shield while protecting personnel. In some examples, the radiological shield may include, or consist of, a steel sheet metal outer skin which is internally lined with lead for radiographic protection. The inside of the cabinet (e.g., surfaces within the radiological shield) may be lined with either aluminum or epoxy paint, to minimize x-ray scatter. This may allow a smaller cabinet to be used than is typical in conventional machines Furthermore, in the example of FIG. 1, x-ray source 102 is equipped with a tube shutter 130. Tube shutter 130 may block x-rays generated by x-ray source 102 from exiting x-ray source 102. In examples where x-ray source 102 continues to generate x-rays, tube shutter 130 may close while the feed apparatus to conveying part carriers into and out of the inspection area of apparatus 100. Tube shutter 130 may reopen when a part carrier is in position in the inspection area of apparatus 100. Having tube shutter 130 blocking x-rays from exiting x-ray source 102 may prevent unnecessary damage to x-ray detector 104 from continuous exposure to x-rays.

In some examples, the curved radiological shield may substantially prevent emission of x-rays into the environment without requiring opening and closing doors to admit objects to be inspected into apparatus 100, such as by blocking or shielding the x-rays from the environment. However, in other examples, apparatus 100 may comprise doors or shutters at feed tubes that feed part carriers into and out of apparatus 100. Such doors or shutters may provide additional radiation shielding. Such doors or shutters may have a mechanical interlock with tube shutter 130 such that tube shutter 130 is closed when the doors or shutters are open, and vice versa.

Furthermore, in some examples, a beam collimator may also be affixed near x-ray source 102 to reduce x-ray scatter, radiation shielding requirements and improve image quality. The beam collimator may narrow a beam of x-rays emitted by x-ray source 102.

Multiple part carriers may be present on the feed assembly at one time. Thus, there may be a queue of incoming part carriers carrying objects waiting to be inspected and a queue of outgoing part carriers carrying objects that apparatus 100 has inspected. The feed assembly may stop movement of all part carriers when apparatus 100 is inspecting an object mounted on any of the part carriers. Thus, the movement of part carriers on the feed assembly is not continuous. In other words, the feed assembly may index multiple parts into and out of apparatus 100. However, part carriers may still move through apparatus 100 at a desired level of throughput.

In some examples, image processing system 124 may take a period of time to generate and analyze radiographs based on an object mounted on a part carrier. Because of the radiological shielding of apparatus 100, part carriers (or objects mounted on the part carriers) in the queue of outgoing part carriers may not be available to be removed for a time period after they are inspected. During this time period while a part carrier is in the queue of outgoing part carriers, image processing system 124 may be generating and analyzing the radiographs for an object mounted on the part carrier. Thus, by the time the part carrier has exited the queue of outgoing part carriers, image processing system 124 may have completed the analysis. For instance, image processing system 124 may be able to determine whether the object mounted on the part carrier is or is not conforming (e.g., defective). In other words, apparatus 100 may provide a physical queue of parts within apparatus 100 in order to allow for adequate CT reconstruction time before the parts are discharged and sorted from apparatus 100.

Thus, image processing system 124 may determine, based on radiographs of object 116 generated by x-ray detector 104, whether object 116 conforms to a standard. In other words, image processing system 124 may determine whether object 116 passes or fails inspection. Furthermore, image processing system 124 may output an indication of whether object 116 conforms to the standard. In some instances, a robotic assembly is configured to place the object at different positions depending on the indication. For instance, when object 116 is indexed to the out feed position, a "pass/fail" status may be indicated in a handshake signal sent to the feeding robot, allowing the part to be sorted into pass/fail locations. In some examples, a marking system such as laser, ink, stamping, or other method can be integrated into the system in order to identify the inspection results (e.g., pass, fail).

In some examples, apparatus 100 may include or may be accompanied by equipment configured to load and unload part carriers from the feed assembly. In some examples, the equipment may position part carriers (or objects mounted thereon) at different locations, based on the outcome of the analysis by image processing system 124. In other examples, humans may load and unload part carriers. Thus, apparatus 100 may be operated as a stand-alone device, directly operated by a human, or integrated into a production line in a fully automated application.

Although not illustrated in the example of FIG. 1, apparatus 100 may comprise devices, such as heat exchangers, air conditioning units, air filters, or other devices, to control the air temperature within apparatus 100. Thus, apparatus 100 may perform inspections conditions that are vibration isolated, temperature controlled, and with x-ray source 102 powered up in a steady state. Furthermore, curved shielding paths for parts entering and exiting the test chamber (e.g., inspection area of apparatus 100) may also allow the test chamber to be maintained at a constant, stable temperature and humidity during inspection. Devices may be added for controlling air purity, air quality, temperature, humidity, or any other air characteristics.

In some examples, respective part carriers are equipped with respective identification tags. Such identification tags may be Radio Frequency Identification (RFID) tags, optical code tags (e.g., bar codes, Quick Response (QR) codes), and/or other types of indicia. In some examples, an identification tag of a part carrier may indicate a type of object mounted on the part carrier. In some examples, an identification tag of a part carrier may indicate a type of a part support member mounted on the part carrier. A tag reader of apparatus 100 (not shown) may be configured to read information from an identification tag of a part carrier. Based on the information read from the identification tag, apparatus 100 may select or otherwise determine an inspection process for an object mounted on the part carrier. The determined inspection process may be one of a plurality of inspection processes that x-ray inspection apparatus 100 is configured to perform. Thus, the information read from an identification tag of a part carrier may indicate to apparatus 100 a recipe to use for inspecting an object mounted on the part carrier. Apparatus 100 may perform the determined inspection process with regard to the object mounted on the part carrier. Thus, apparatus 100 may perform different inspection processes for different types of objects mounted on different part carriers. This may allow objects of different types to be fed into apparatus 100 for inspection. The determination of the inspection process and the performance of the determined inspection process may be performed at least in part by one or more processors (e.g., microprocessors or other types of integrated circuits) of apparatus 100.

An inspection process may include generating particular radiographs and analyzing the generated radiographs to determine whether an object conforms to a standard. For instance, an inspection process may comprise generating a particular number of radiographs with particular positioning characteristics, exposure characteristics (e.g., radiation intensity levels, exposure times, etc.), and other characteristics. The positioning characteristics for a radiograph may comprise a vertical height to which the part carrier is lifted for the radiograph and an angle of rotation for the radiograph. The positioning characteristics may also involve horizontal and/or vertical positions of x-ray source 102 and/or x-ray detector 104. Determining whether the object conforms to the standard may include applying various criteria to determine whether the object sufficiently conforms to the standard. For instance, the inspection process may specify particular size tolerances and other criteria. Apparatus 100 may use such criteria in determining whether the object passes inspection. In this way, in some examples, one or more processors of apparatus 100 may determine, based on information read from an identification tag of a part carrier, at least one of: how many radiographs to generate to inspect the object, positioning characteristics of the radiographs, exposure characteristics of the radiographs, and a standard.

Figure 2:
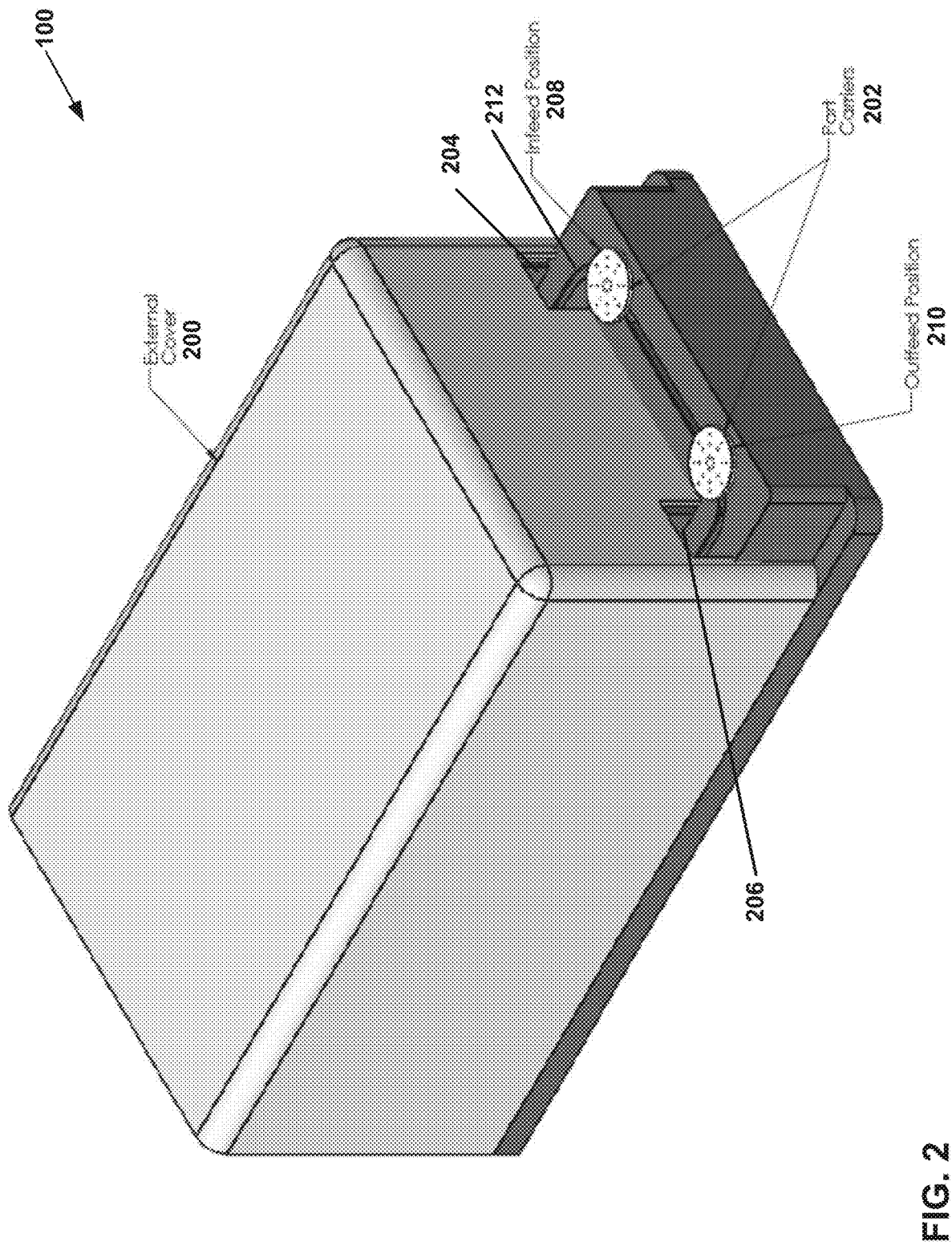
FIG. 2 is a schematic diagram illustrating an example external view of an x-ray inspection apparatus, in accordance with a technique of this disclosure.

FIG. 2 is a schematic diagram illustrating an example external view of x-ray inspection apparatus 100, in accordance with a technique of this disclosure. In the example of FIG. 2, apparatus 100 includes an external cover 200. External cover 200 encloses most of apparatus 100, including x-ray source 102, x-ray detector 104, drive assembly 122, and other components of apparatus 100. However, external cover 200 does not enclose an area for loading objects onto and off of part carriers 202. A top cover, or other panels, of external cover 200 may be removable for access to internal components (e.g., CT components).

In the example of FIG. 2, the feed assembly moves part carriers 202 in a counter-clockwise direction, bringing part carriers into apparatus 100 at a right opening 204 defined in external cover 200 and carrying part carriers out of apparatus 100 at a left opening 206 defined in external cover 200. Objects to be inspected may be loaded onto part carriers at an infeed position 208. Objects inspected by apparatus 100 may be unloaded from part carriers at an outfeed position 210. Objects may be loaded and/or unloaded manually by a person, or mechanically (e.g., using a robot). In the example of FIG. 2, the feed assembly is shown as comprising a track 212. Thus, apparatus 100 may provide separate, discrete input and output locations on order to keep tested and untested products from being confused by a human operator.

Figure 3:
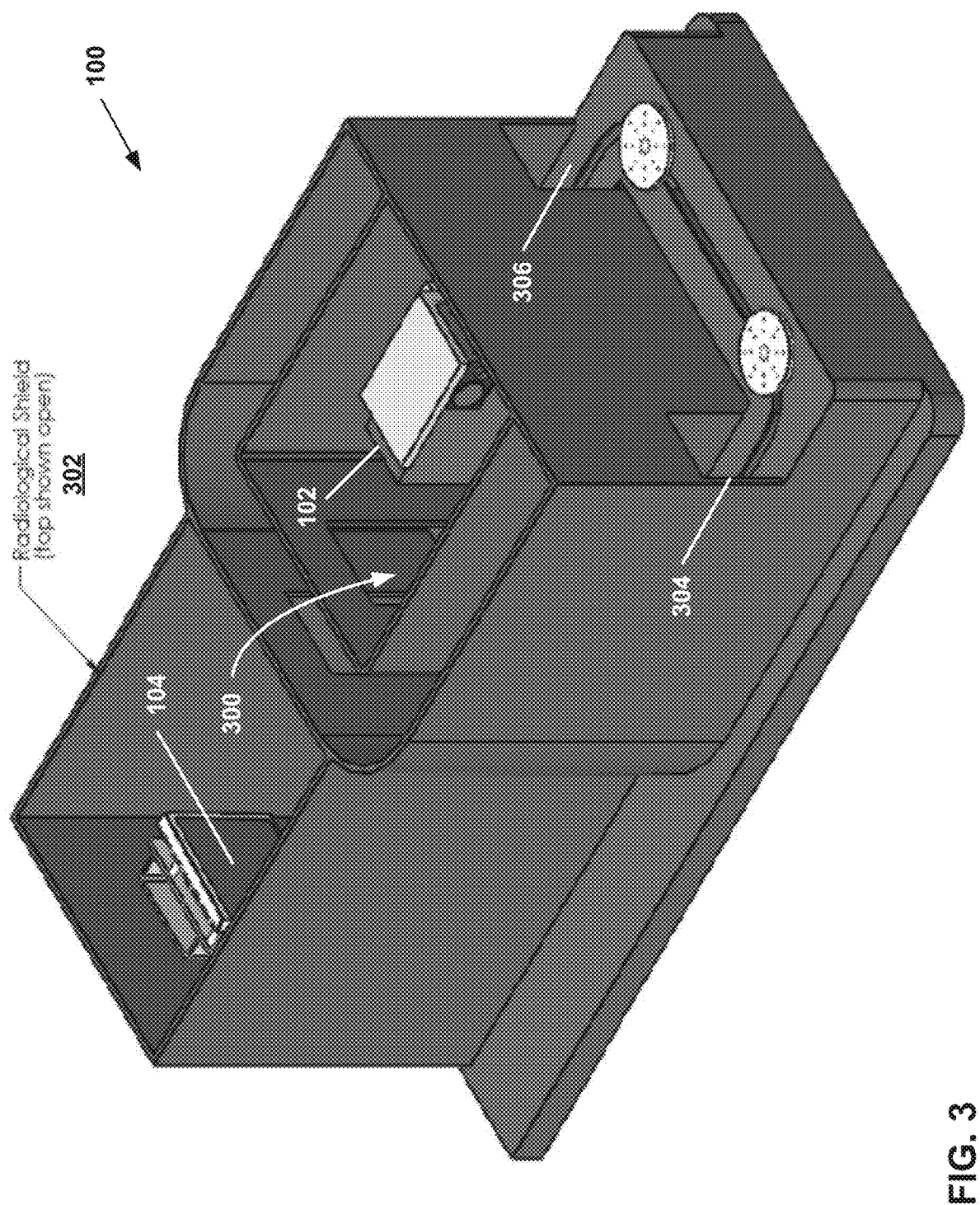
FIG. 3 is a schematic diagram illustrating an example cutaway view of the x-ray inspection apparatus of FIG. 2, in accordance with a technique of this disclosure.

FIG. 3 is a schematic diagram illustrating an example cutaway view of x-ray inspection apparatus 100 of FIG. 2, in accordance with a technique of this disclosure. In the example of FIG. 3, the feed mechanism moves part carriers to an inspection area 300 located between x-ray source 102 and x-ray detector 104. A radiological shield 302 is positioned and shaped to prevent x-rays generated by x-ray source 102 from escaping openings 304, 306 defined in radiological shield 302. Thus, in some examples, apparatus 100 may be able to capture x-ray radiographs of objects without opening and closing physical doors to prevent radiation from escaping apparatus 100. Openings 304, 306 align with openings 204, 206 defined in external cover 200 (FIG. 2), for entry and exit of part carriers carrying objects to be inspected. As shown in the example of FIG. 3 and other examples, a top of radiological shield 302 may be removable for access to internal components (e.g., CT components).

Figure 4:
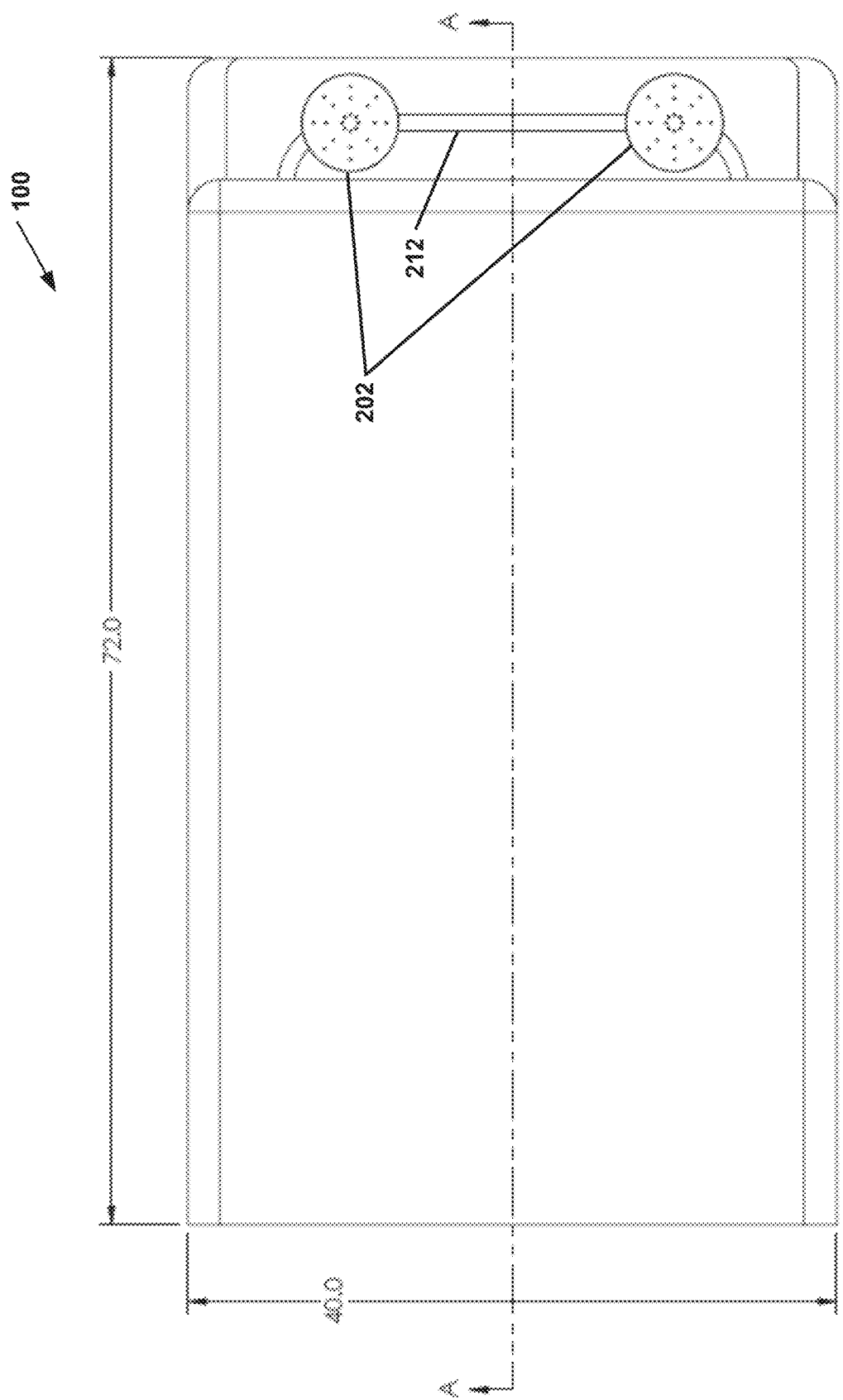
FIG. 4 is a schematic diagram illustrating an example overhead plan of external components of the x-ray inspection apparatus of FIG. 2, in accordance with a technique of this disclosure.

FIG. 4 is a schematic diagram illustrating an example overhead plan of external components of x-ray inspection apparatus 100 of FIG. 2, in accordance with a technique of this disclosure. In the example of FIG. 4, apparatus 100 is 72.0 inches (182.88 centimeters) in length and 40.0 inches (101.6 centimeters) wide. Thus, in the example of FIG. 4, apparatus 100 may be suited for inspection of relatively small objects. However, apparatus 100 may have other sizes.

As shown in the example of FIG. 4, part carriers 202 may be formed to define a set of holes. In the example of FIG. 4, the holes have a radial pattern from the centers of part carriers 202. However, on other example, the holes may be differently arranged. The holes defined in part carriers 202 may be shaped to accept attachment portions of part support members, such as pegs extending from lower surfaces of part support members.

Figure 5:
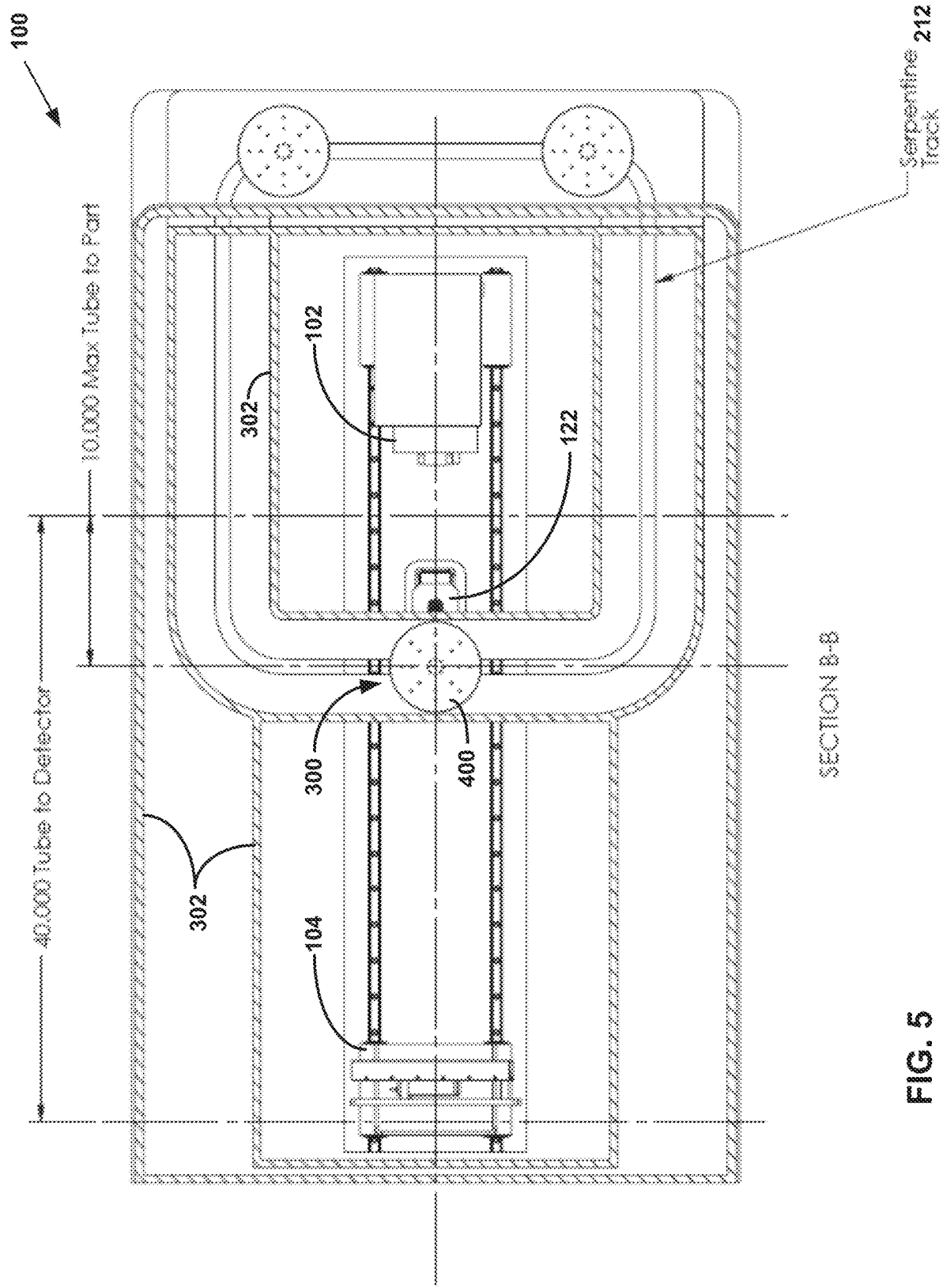
FIG. 5 is a schematic diagram illustrating an example overhead plan of internal components of the x-ray inspection apparatus of FIG. 2, in accordance with a technique of this disclosure.

FIG. 5 is a schematic diagram illustrating an example overhead plan of internal components of the x-ray inspection apparatus 100 of FIG. 2, in accordance with a technique of this disclosure. In the example of FIG. 5, a part carrier 400 is located at inspection area 300, near the center of apparatus 100. While at inspection area 300, part carrier 400 is located above drive assembly 122. Drive assembly 122 may lift part carrier 400 from the feed assembly, thereby isolating part carrier 400 from vibrations of the feed assembly during inspection of an object positioned on part carrier 400.

In the example of FIG. 5, when a part (or other object) is located at inspection area 300, a maximum distance from the part to an x-ray tube of x-ray source 102 may be 10.000 inches (25.4 centimeters). Furthermore, in the example of FIG. 5, a distance from the x-ray tube to x-ray detector 40.000 inches (101.6 centimeters). In other examples, other distances and dimensions are possible.

Figure 6:
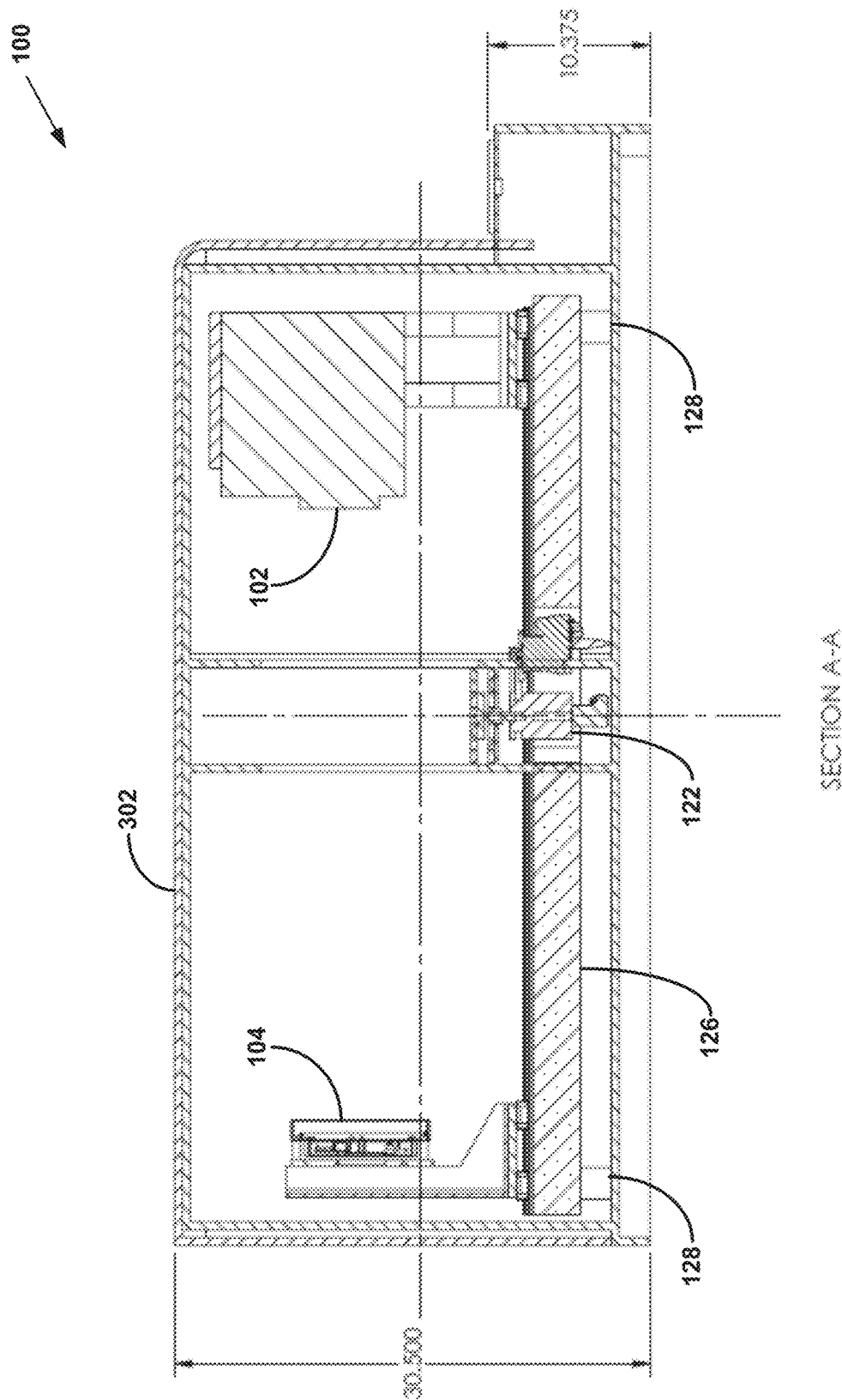
FIG. 6 is a schematic diagram illustrating an example cutaway elevation view of the x-ray inspection apparatus of FIG. 2, in accordance with a technique of this disclosure.

FIG. 6 is a schematic diagram illustrating an example cutaway elevation view of x-ray inspection apparatus 100 of FIG. 2, in accordance with a technique of this disclosure. FIG. 6 is generally similar to FIG. 1. In the example of FIG. 6, part carriers are located 10.375 inches (26.3525 centimeters) above a lower side of apparatus 100. Furthermore, in the example of FIG. 6, apparatus 100 is a total of 30.500 inches tall (77.47 centimeters). In other examples, other dimensions are possible. For instance, in various examples, apparatus 100 may be installed on a table top, a stand, or integrated into a production line.

Figure 7:
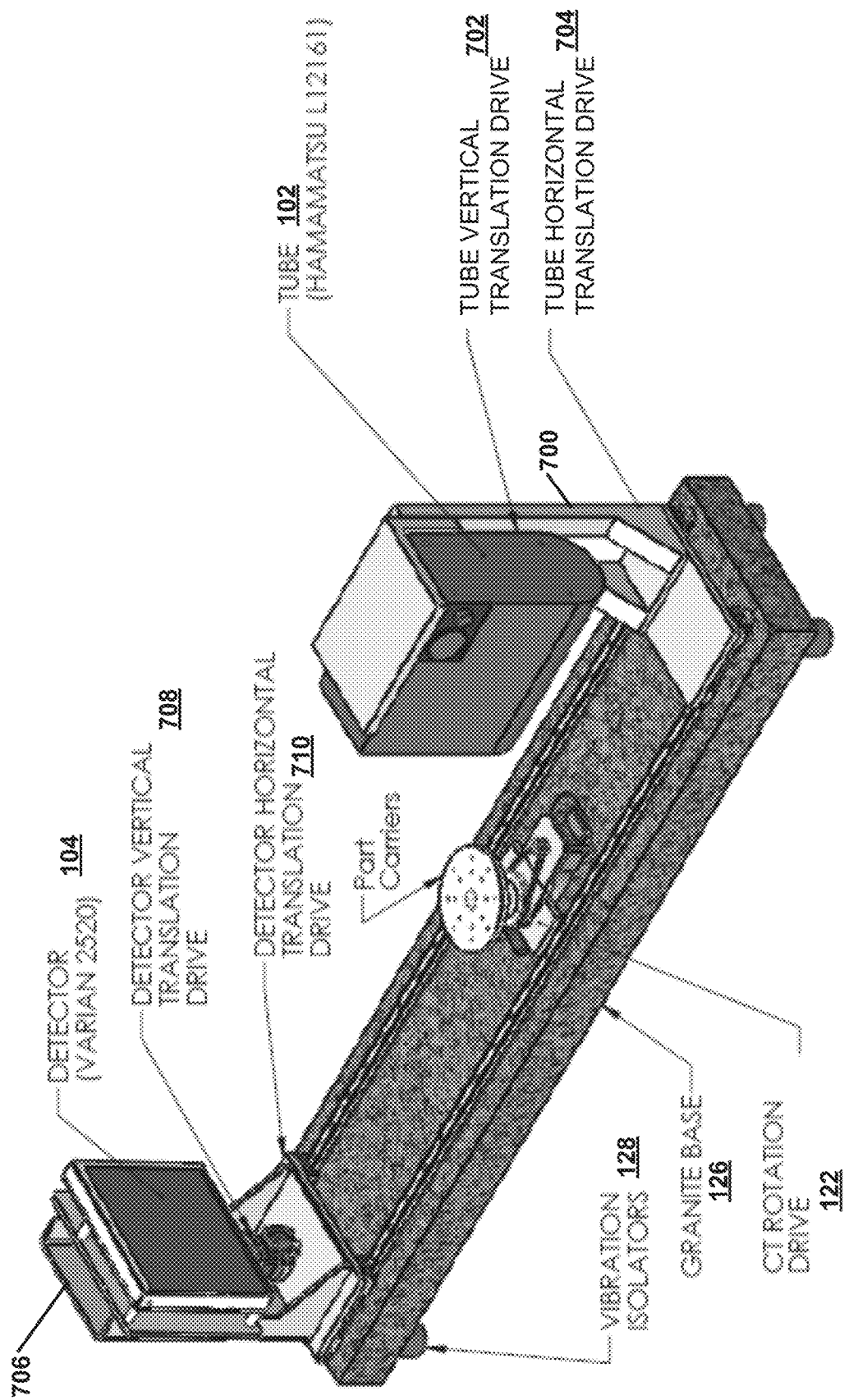
FIG. 7 is a perspective view of example x-ray components of the x-ray inspection apparatus, in accordance with a technique of this disclosure.

FIG. 7 is a perspective view of example x-ray components of x-ray inspection apparatus 100, in accordance with a technique of this disclosure. In the example of FIG. 7, x-ray source 102, which is labeled "tube 102" in FIG. 7, and x-ray detector 104, which is labeled "detector 104" in FIG. 7, are mounted on base 126. In the example of FIG. 7, base 126 is formed from granite. Base 126 rests on vibration isolators 128. Drive assembly 122, which in the example of FIG. 7 is a CT rotation drive, is also mounted on base 126. In the example of FIG. 7, x-ray source 102 is a Hamamatsu L12161 x-ray generator and x-ray detector 104 is a Varian 2520 x-ray detector. In other examples, other types of x-ray generators and x-ray detectors are used.

In the example of FIG. 7, tube 102 is mounted on a support member 700. Support member 700 is coupled with a vertical translation drive 702 and a horizontal translation drive 704. Vertical translation drive 702 is equipped to move tube 102 in a vertical direction. Horizontal translation drive 704 is equipped to move tube 102 horizontally (e.g., toward x-ray detector 104).

Similarly, x-ray detector 104 is mounted on a support member 706. Support member 706 is coupled with a vertical translation drive 708 and a horizontal translation drive 710. Vertical translation drive 708 is equipped to move tube 102 in a vertical direction. Horizontal translation drive 710 is equipped to move x-ray detector 104 horizontally (e.g., toward tube 102). X-ray source 102 and x-ray detector 104 may be moved vertically to inspect objects of various sizes. Furthermore, x-ray source 102 and x-ray detector 104 may be moved vertically to accomplish helical x-ray tomography. X-ray source 102 and/or x-ray detector 104 may be moved horizontally to achieve different degrees of geometric magnification.

Figure 8:
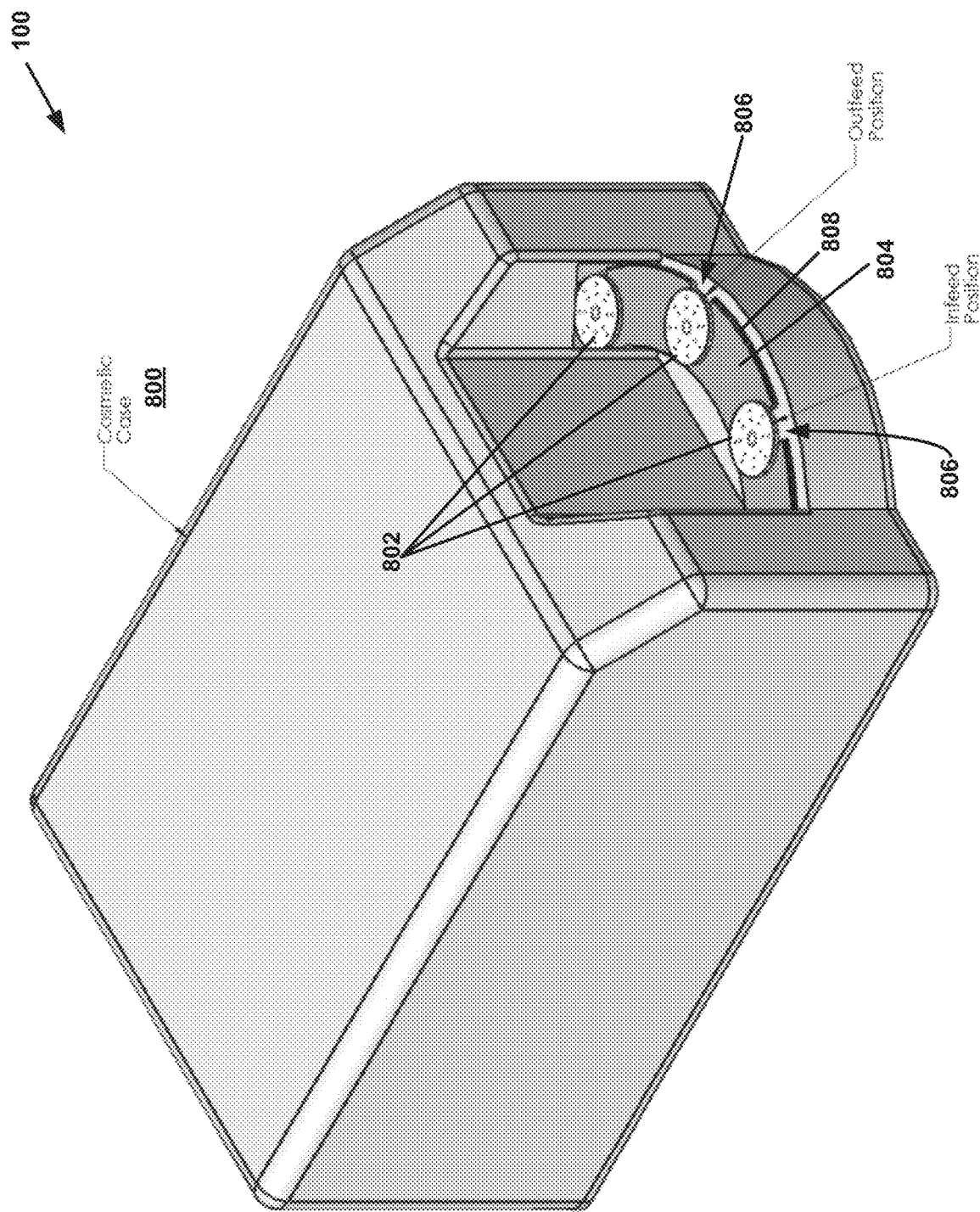
FIG. 8 is a schematic diagram illustrating an example external view of an x-ray inspection apparatus, in accordance with a technique of this disclosure.

FIG. 8 is a schematic diagram illustrating an example external view of an x-ray inspection apparatus 100, in accordance with a technique of this disclosure. Similar to the example of FIG. 2, in the example of FIG. 8, apparatus 100 includes an external case 800. In the example of FIG. 8, external case 800 is labeled a "cosmetic case" because external case 800 does not necessarily perform a functional role, such as radiological shielding, but rather may exist for aesthetic or safety reasons.

As shown in the example of FIG. 8, the feed assembly for taking part carriers 802 into and out of apparatus 100 comprises a ring 804 instead of a serpentine track. Ring 804 is an annular-shaped object for carrying part carriers 802. Thus, x-ray inspection apparatus 100 may comprise an annular ring drive supporting one or more part carriers. Thus, ring 804 may be an example of carrier support members 108. In the example of FIG. 8, ring 804 is shaped to define a plurality of inlets 806 (i.e., notches) from an outer edge 808 of ring 804. Part carriers 802 may be slipped onto ring 804 by inserting, toward a center of ring 804, respective carrier engagement members extending distally (e.g., downward), relative to top surfaces of part carriers 802, from centers of part carriers 802. The carrier engagement members may be disc-shaped with radii smaller than radii of part carriers 802.

Figure 9:
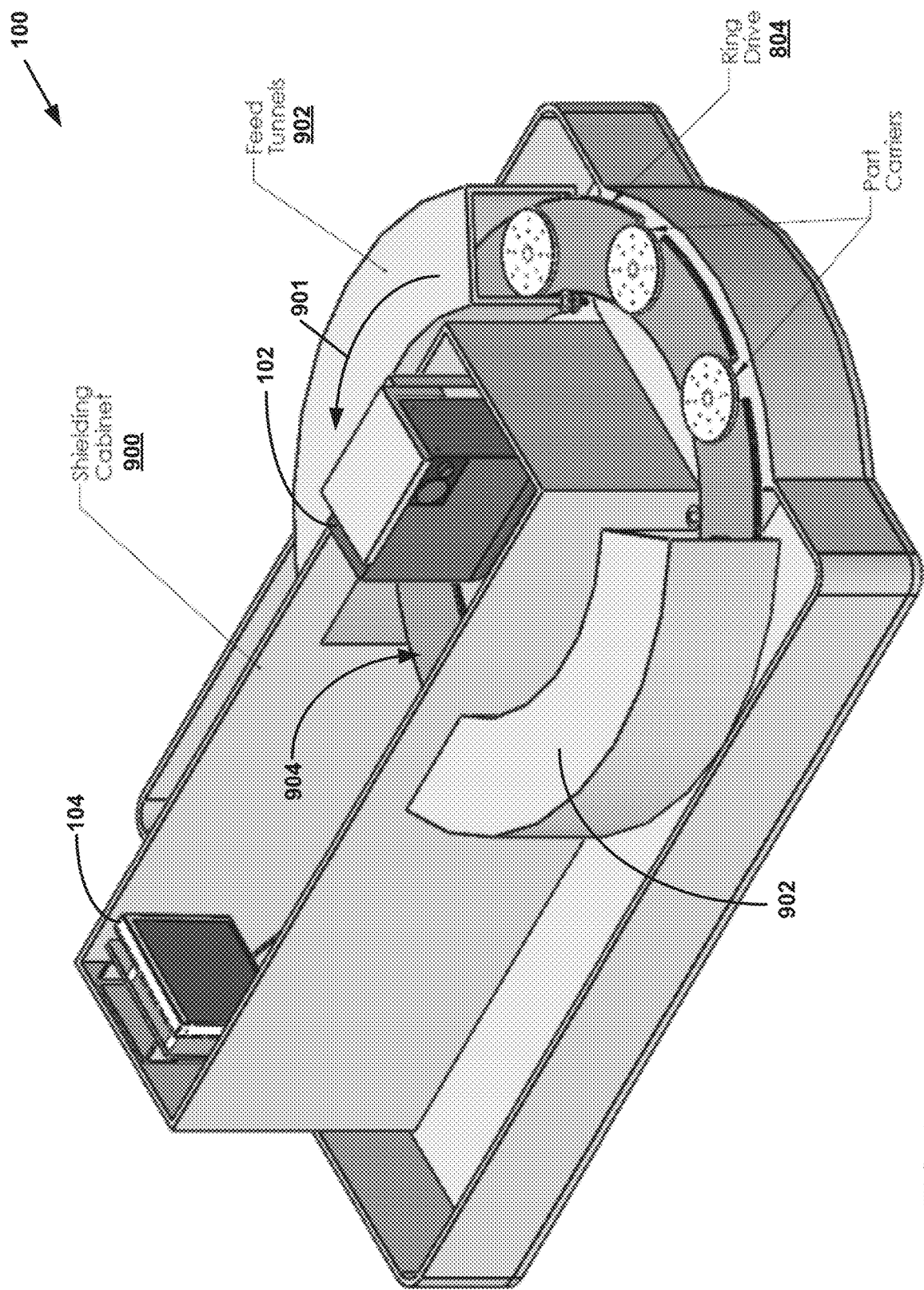
FIG. 9 is a schematic diagram illustrating an example cutaway view of the x-ray inspection apparatus of FIG. 8, in accordance with a technique of this disclosure.

FIG. 9 is a schematic diagram illustrating an example cutaway view of x-ray inspection apparatus 100 of FIG. 8, in accordance with a technique of this disclosure. The example of FIG. 9 corresponds to the example of FIG. 8 with external case 800 and a top portion of a shielding cabinet 900 removed. As shown in the example of FIG. 9, ring 804, which is labeled "ring drive 804" in the example of FIG. 9, rotates in a counter-clockwise direction 901 to bring part carriers through feed tunnels 902 into and out of an inspection area 904 located between x-ray source 102 and x-ray detector 104 of apparatus 100. In other examples, ring 804 may rotate in a clockwise direction. Thus, ring 804 may rotate to feed part carriers into and out of apparatus 100.

Feed tunnels 902 include a radiological shielding material and are shaped to prevent x-rays generated by x-ray source 102 from escaping apparatus 100. Thus, in some examples, apparatus 100 may be able to capture x-ray radiographs of objects without opening and closing physical doors to prevent radiation from escaping apparatus 100.

The rotation of ring 804 may cease when a part carrier is in inspection area 904 and radiographs are being taken of an object mounted on the part carrier. After the radiographs have been taken and the part carrier has been lowered back onto ring 804, ring 804 may rotate again to bring a next part carrier into inspection area 904.

Figure 10:
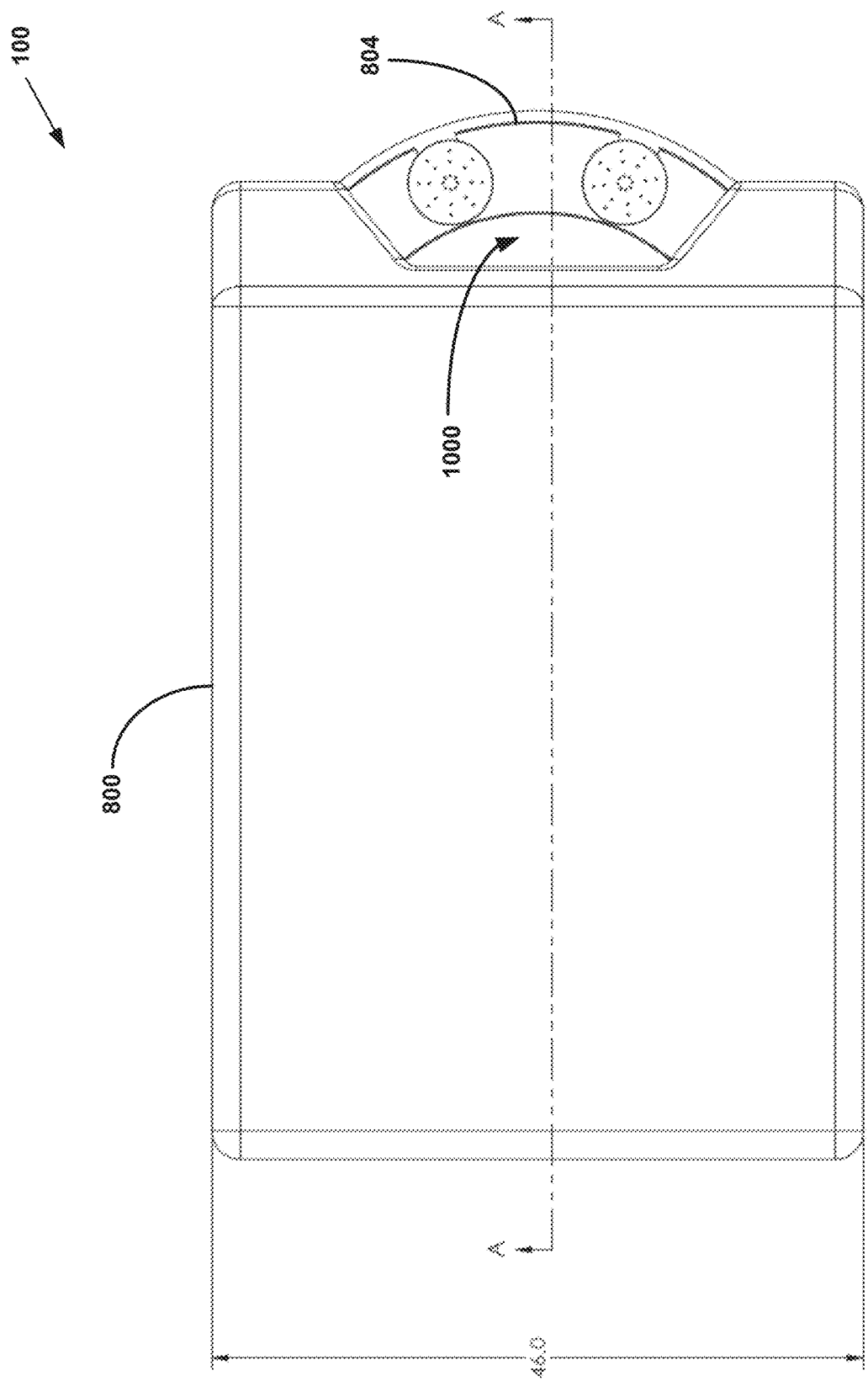
FIG. 10 is a schematic diagram illustrating an example overhead plan of external components of the x-ray inspection apparatus of FIG. 8, in accordance with a technique of this disclosure.

FIG. 10 is a schematic diagram illustrating an example overhead plan of external components of x-ray inspection apparatus 100 of FIG. 8, in accordance with a technique of this disclosure. In the example of FIG. 10, external case 800 is shown on apparatus 100. External case 800 covers most of apparatus 100 except for a loading and unloading area 1000 of ring 804. In the example of FIG. 10, apparatus 100 is 46.0 inches (116.84 centimeters) wide. In other examples, apparatus 100 has different widths.

Figure 11:
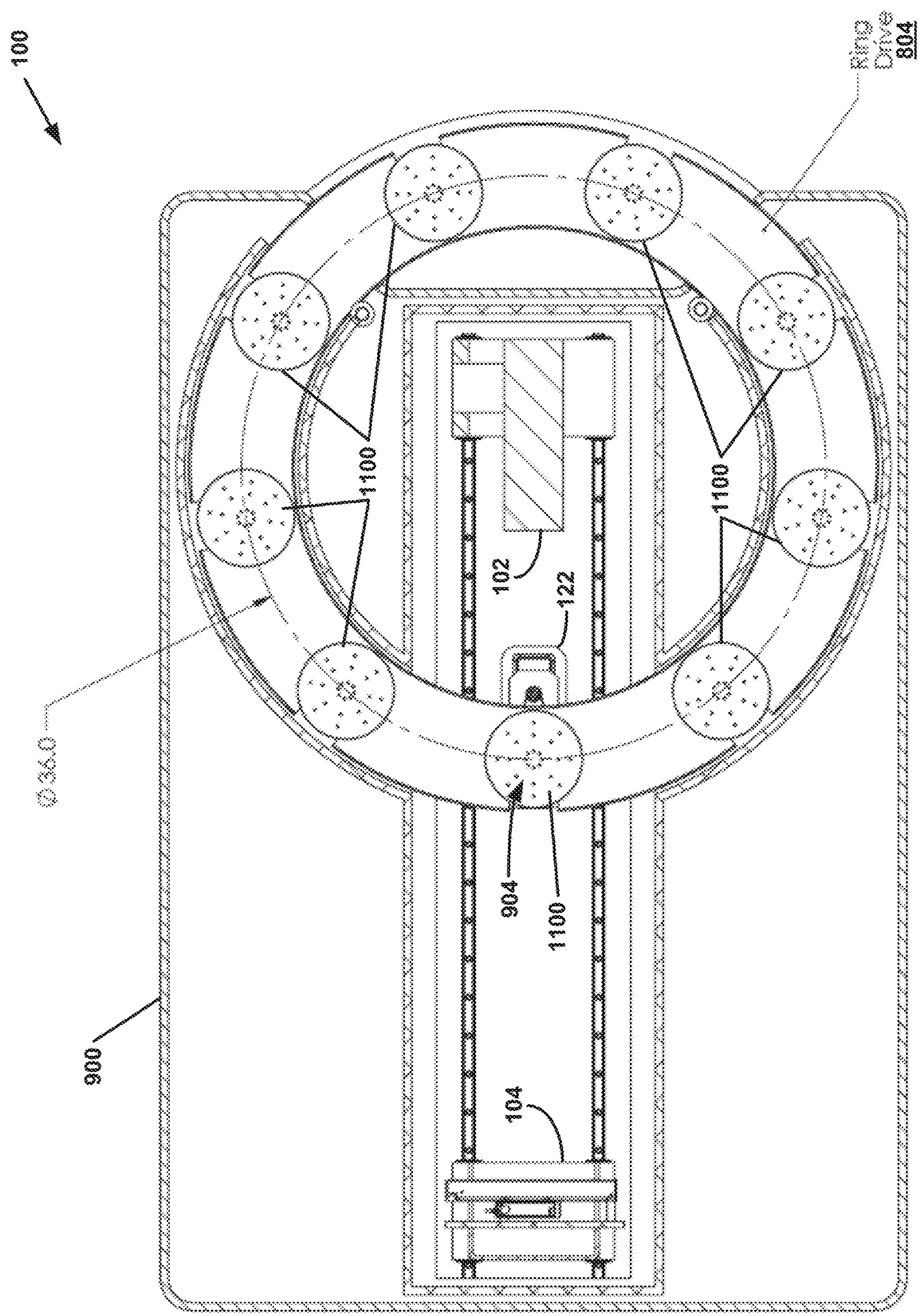
FIG. 11 is a schematic diagram illustrating an example overhead plan of internal components of the x-ray inspection apparatus of FIG. 8, in accordance with a technique of this disclosure.

FIG. 11 is a schematic diagram illustrating an example overhead plan of internal components of x-ray inspection apparatus 100 of FIG. 8, in accordance with a technique of this disclosure. In the example of FIG. 11, ring 804 rotates to convey part carriers 1100 to inspection area 904, which is located between x-ray source 102 and x-ray detector 104. In the example of FIG. 11, ring 804 has a diameter of 36 inches (91.44 centimeters). In other examples, ring 804 has different diameters.

Figure 12:
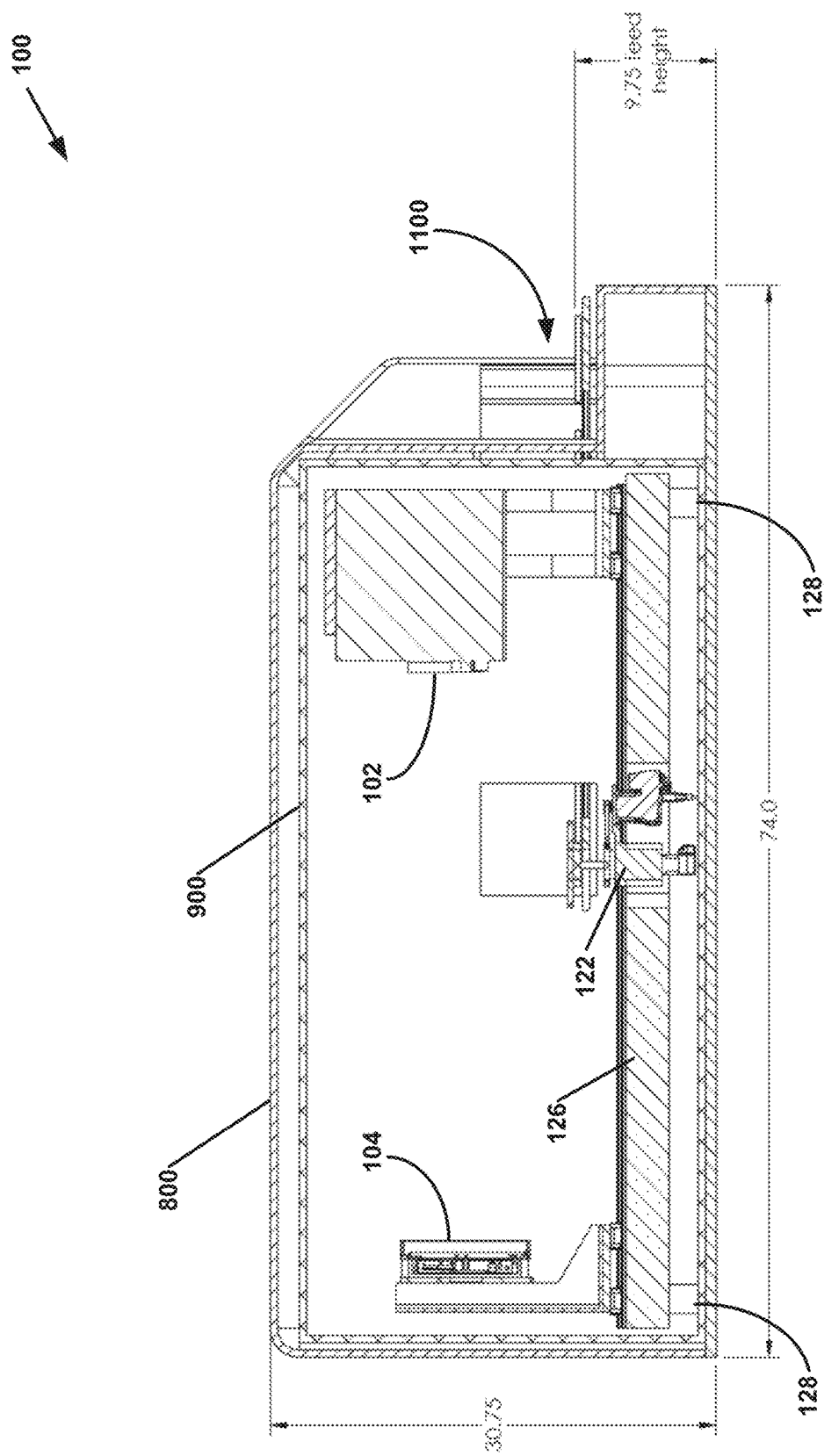
FIG. 12 is a schematic diagram illustrating an example cutaway elevation view of the x-ray inspection apparatus of FIG. 8, in accordance with a technique of this disclosure.

FIG. 12 is a schematic diagram illustrating an example cutaway elevation view of x-ray inspection apparatus 100 of FIG. 8, in accordance with a technique of this disclosure. In the example of FIG. 12, apparatus 100 is 30.75 inches (78.105 centimeters) tall and 74.0 inches (187.96 centimeters long). Furthermore, in the example of FIG. 12, part carriers are loaded and unloaded at a height of 9.75 inches (24.765 centimeters) above a bottom surface of apparatus 100. In other words, the feed height of apparatus 100 is 9.75 inches (24.765 centimeters). In other examples, other dimensions are used.

Figure 13:
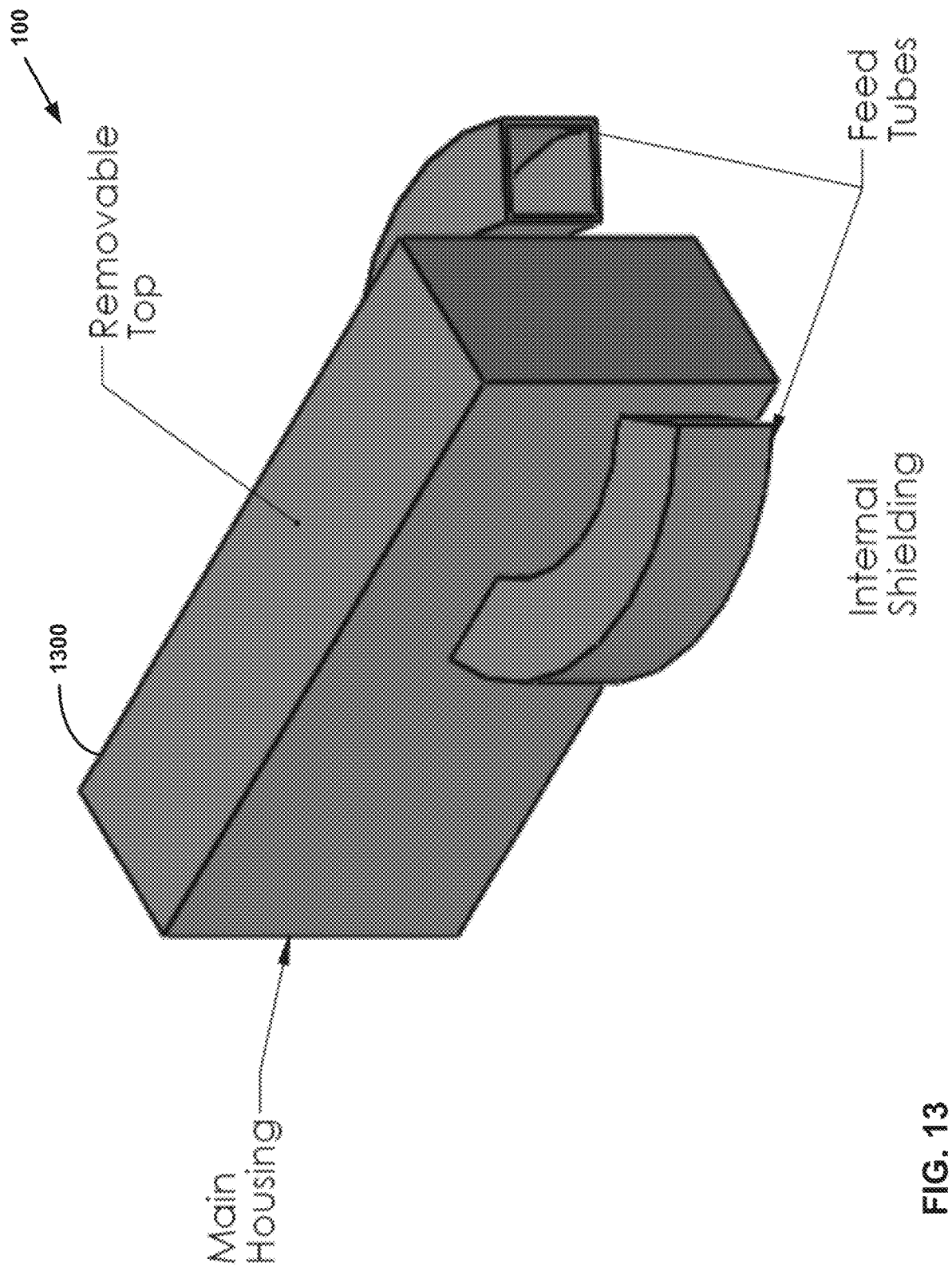
FIG. 13 is a schematic diagram illustrating an example external view of an x-ray inspection apparatus, in accordance with a technique of this disclosure.

FIG. 13 is a schematic diagram illustrating an example external view of x-ray inspection apparatus 100, in accordance with a technique of this disclosure. In the example of FIG. 13, apparatus 100 may operate in a similar fashion as in FIGS. 8-12. However, in the example of FIG. 13, an external case 1300 is differently shaped from the examples of FIGS. 8-12.

Figure 14:
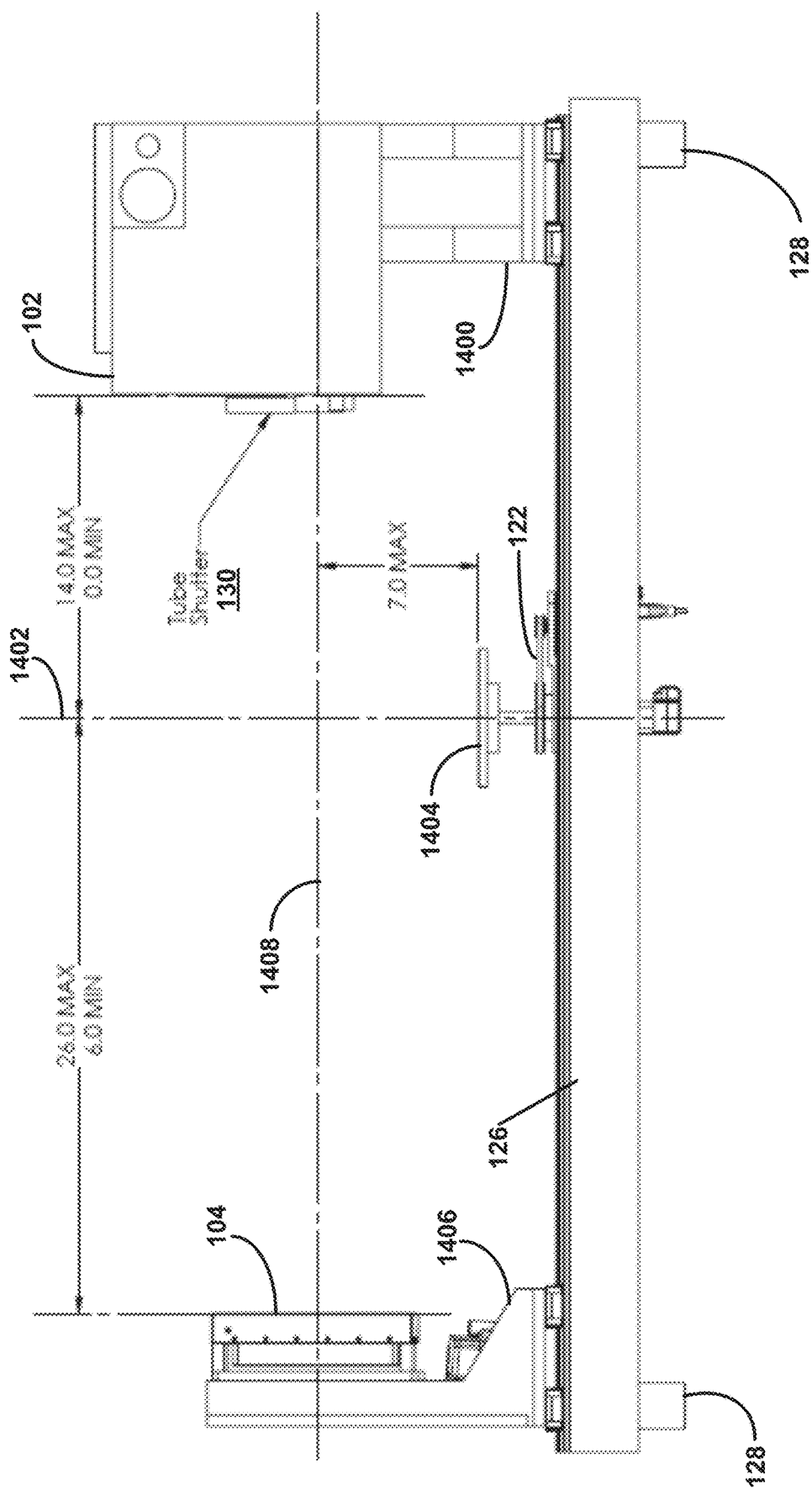
FIG. 14 is a schematic diagram illustrating an example elevation view of x-ray components of an x-ray inspection apparatus, in accordance with a technique of this disclosure.

FIG. 14 is a schematic diagram illustrating an example elevation view of x-ray components of x-ray inspection apparatus 100, in accordance with a technique of this disclosure. In the example of FIG. 14, x-ray source 102 is equipped with tube shutter 130. X-ray source 102 is mounted to a support member 1400 having a horizontal drive assembly configured to move x-ray source 102 toward and away from an axis 1402. In some examples, axis 1402 corresponds to an axis of rotation of a part carrier 1404 when positioned in an inspection area of apparatus 100. In the example of FIG. 14, the horizontal drive assembly of support member 1400 is configured to position x-ray source 102 at a distance from 0 inches (0 centimeters) to 14 inches (35.56 centimeters) from axis 1402. In other examples, other dimensions or ranges are used.

Similarly, in the example of FIG. 14, x-ray detector 104 is mounted to a support member 1406 having a horizontal drive assembly configure to move x-ray detector 104 toward and away from axis 1402. In the example of FIG. 14, the horizontal drive assembly of support member 1400 is configured to position x-ray detector 104 at a distance from 6.0 inches (15.24 centimeters) to 26.0 inches (66.04 centimeters) from axis 1402. In other examples, other dimensions are used. Although not explicitly mentioned with regard to certain other examples of this disclosure, the drive assemblies may be present in such examples.

Furthermore, drive assembly 122 is configured to lift part carriers, such as part carrier 1404. By lifting part carrier 1404, drive assembly 122 may align an object to be inspected with an axis 1408 from x-ray source 102 to x-ray detector 104. In the example of FIG. 14, drive assembly 122 is configured to lift part carriers up to 7.0 inches (17.78 centimeters). In other examples, other dimensions are used.

Figure 15B:
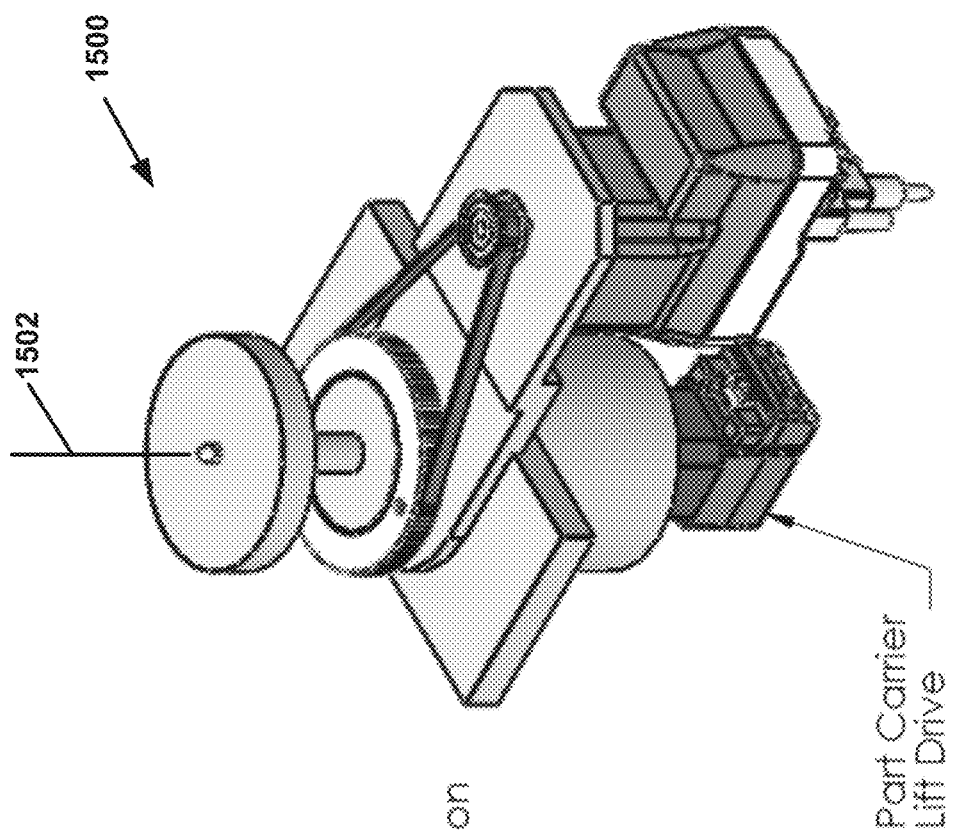
FIG. 15B is a schematic diagram illustrating the example CT rotation drive of FIG. 15A in an extended position, in accordance with a technique of this disclosure.
Figure 15A:
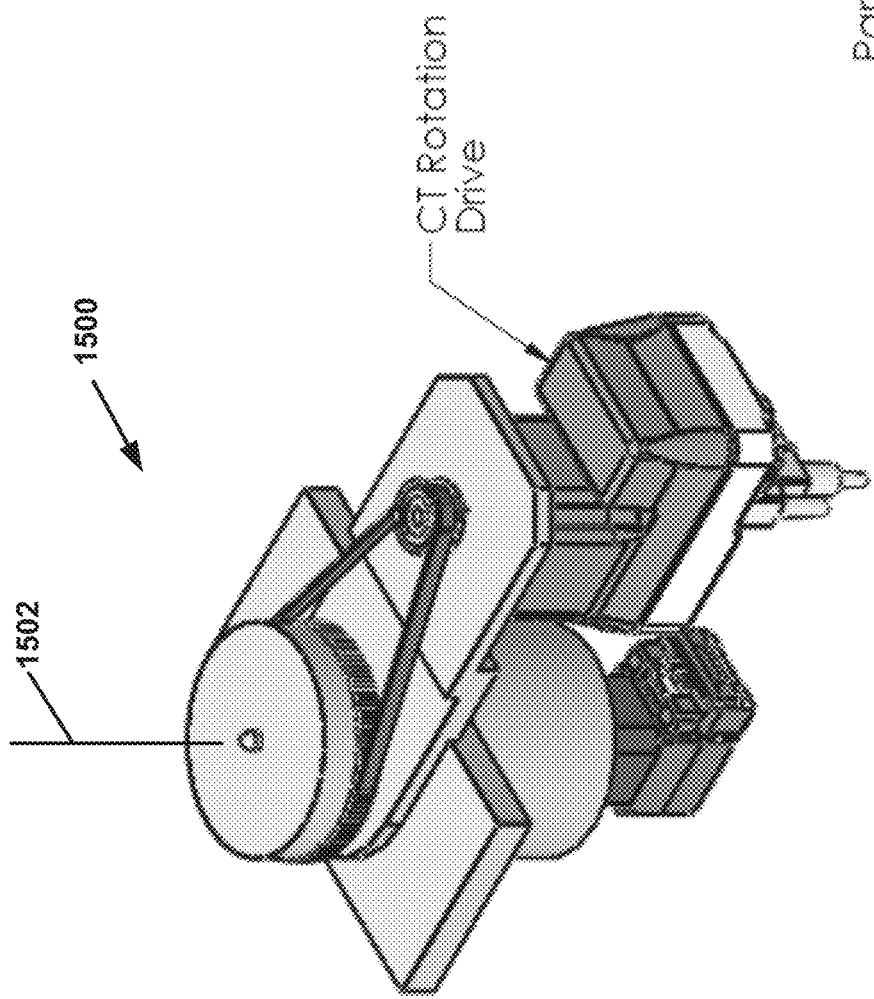
FIG. 15A is a schematic diagram illustrating an example computed tomography (CT) rotation drive in a retracted position, in accordance with a technique of this disclosure.

FIG. 15A is a schematic diagram illustrating an example CT rotation drive 1500 in a retracted position, in accordance with a technique of this disclosure. FIG. 15B is a schematic diagram illustrating the example CT rotation drive 1500 of FIG. 15A in an extended position, in accordance with a technique of this disclosure. CT rotation drive 1500 may be an example of drive assembly 122. CT rotation drive 1500 may be in the retracted position when the feed assembly is moving a part carrier into and out of the inspection area of apparatus 100. CT rotation drive 1500 may be in the extended position when a part carrier is in the inspection area of apparatus 100 and apparatus 100 is inspecting an object mounted on the part carrier. When CT rotation drive 1500 is in the extended position, or while CT rotation drive 1500 is changing from the retracted position to the extended position, CT rotation drive 1500 may rotate the part carrier about an axis of rotation 1502.

Figure 16:
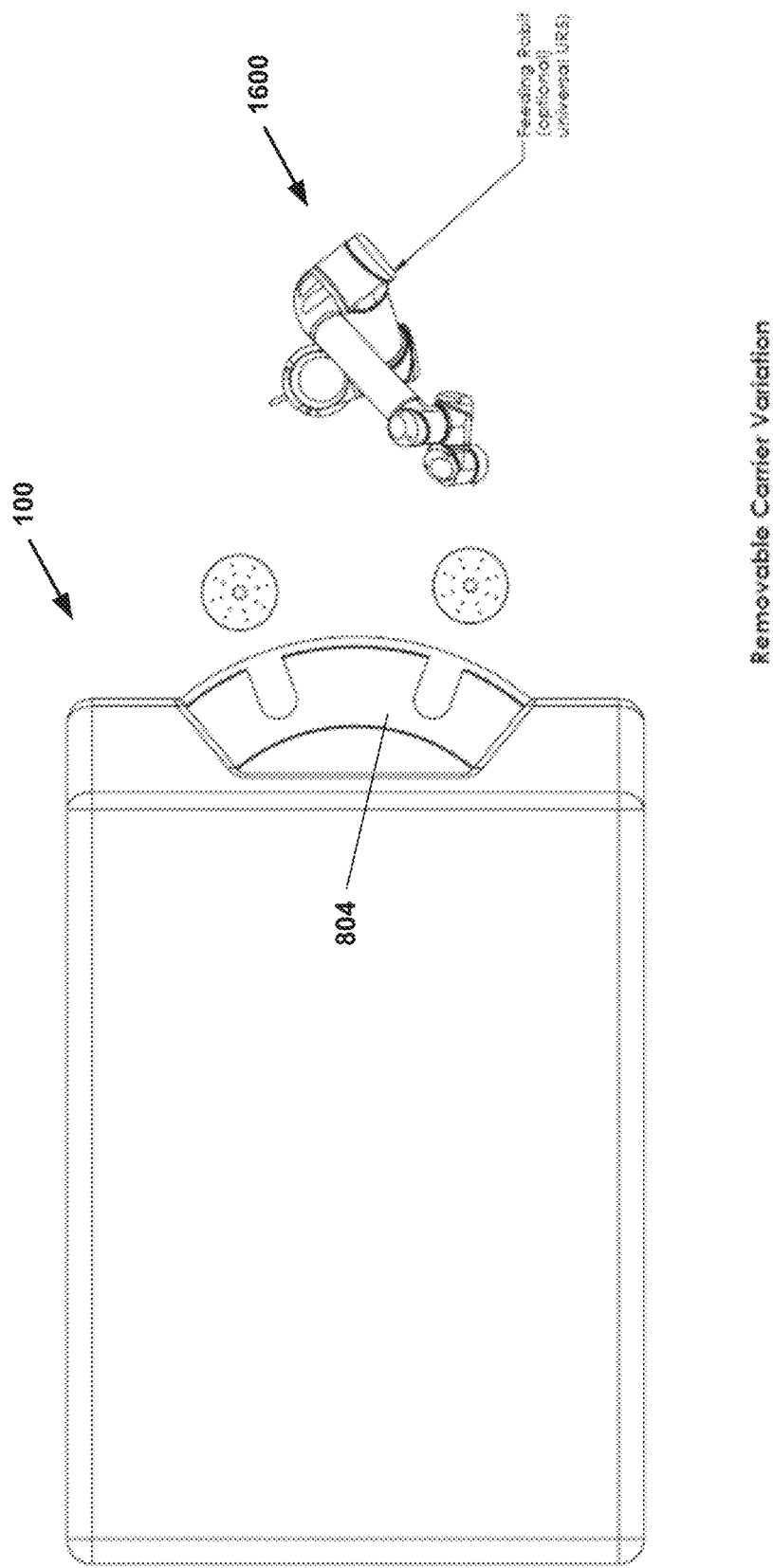
FIG. 16 is a schematic diagram illustrating an example x-ray inspection apparatus paired with a robotic feeding unit, in accordance with a technique of this disclosure.
Figure 16:
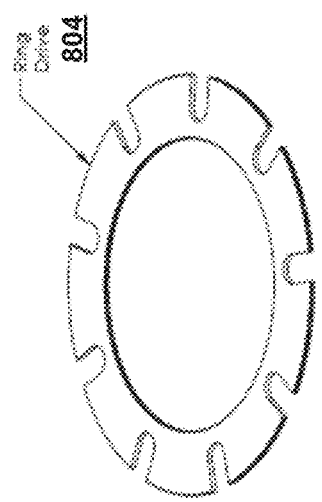

FIG. 16 is a schematic diagram illustrating an example x-ray inspection apparatus 100 paired with a robotic feeding unit 1600, in accordance with a technique of this disclosure. In the example of FIG. 16, apparatus 100 is configured in a manner similar to that of FIGS. 8-12, and may have ring drive 804. In the example of FIG. 16, part carriers are removable from ring drive 804. In other examples, part carriers are held captive within apparatus 100 but may be removed for tooling changes. Robotic feeding unit 1600 may place part carriers onto ring drive 804 and may remove part carriers from ring drive 804. In the example of FIG. 16, robotic feeding unit 1600 is a robotic arm. In other examples, robotic feeding unit 1600 has different forms.

In some examples, robotic feeding unit 1600 is configured to place, in different locations, part carriers carrying inspected objects, depending on outcomes of analyses performed by apparatus 100. For example, if apparatus 100 determines that an object is defective, robotic feeding unit 1600 places a part carrier carrying the object in one location. In this example, if apparatus 100 determines the object is not defective, robotic feeding unit places the part carrier carrying the object in a different location.

FIG. 16 also shows ring drive 804 separated from apparatus 100. As shown, an outer edge of ring drive 804 defines a series of notches (i.e., inlets) shaped to accept part carriers.

Figure 17:
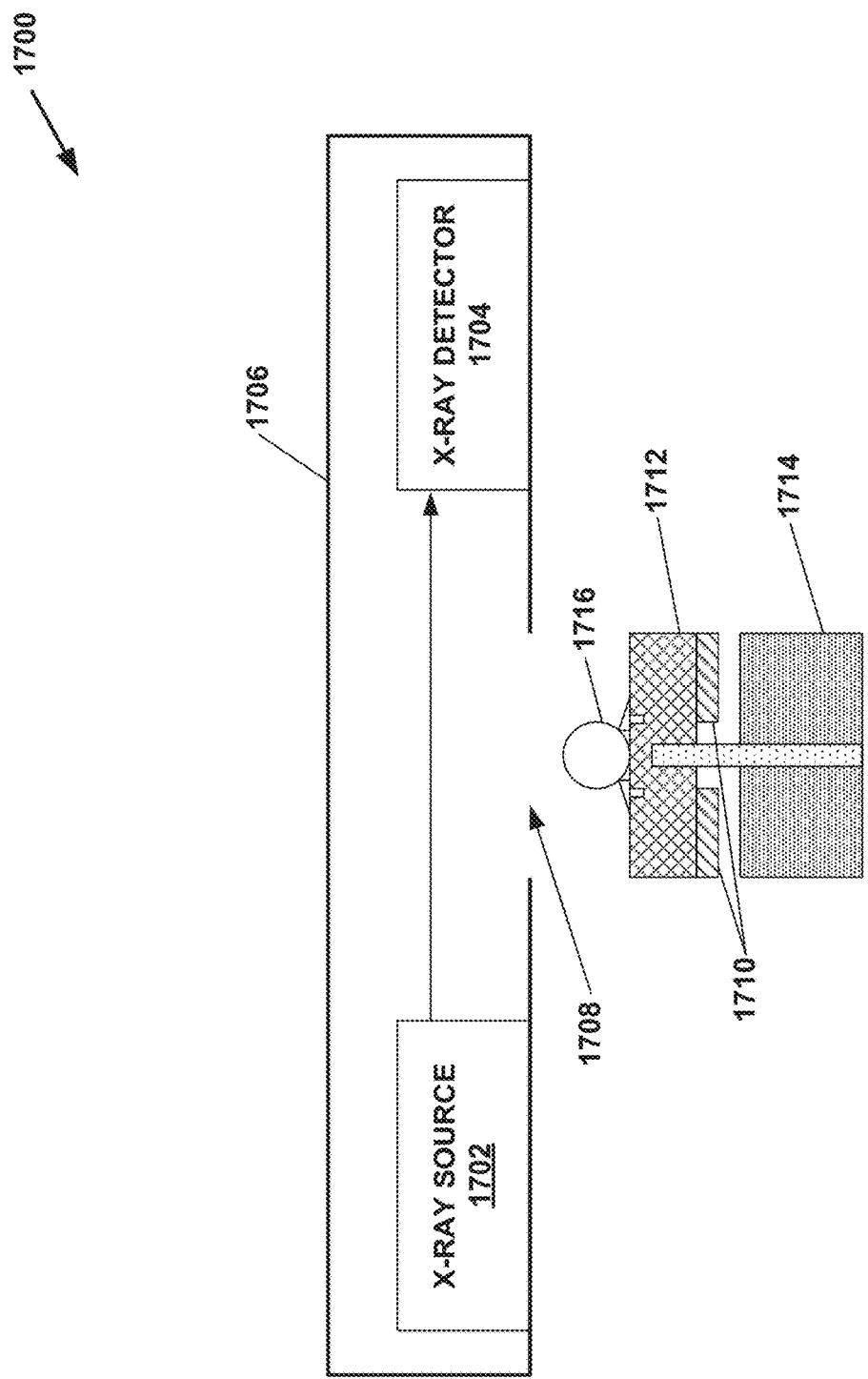
FIG. 17 is a block diagram illustrating an example x-ray inspection apparatus, in accordance with a technique of this disclosure.

FIG. 17 is a block diagram illustrating an example x-ray inspection apparatus 1700, in accordance with a technique of this disclosure. In the example of FIG. 17, apparatus 1700 includes an x-ray source 1702 and an x-ray detector 1704. X-ray source 1702 and x-ray detector 1704 may be similar in type and function to x-ray source 102 and x-ray detector 104. In the example of FIG. 17, x-ray source 1702 and x-ray detector 1704 are disposed within a radiological shield 1706. Radiological shield 1706 is shaped to define an opening 1708.

Figure 18:
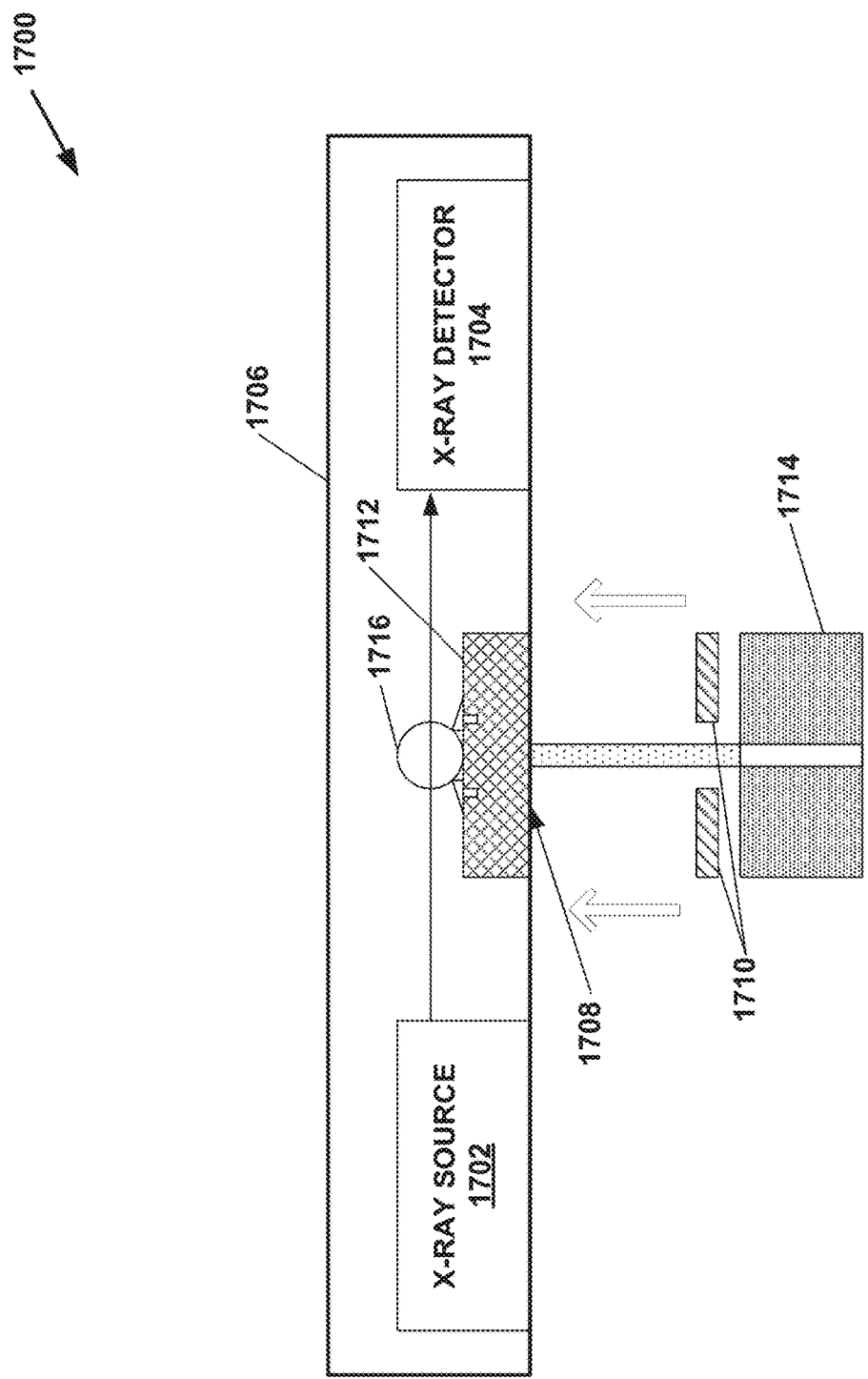
FIG. 18 is a block diagram illustrating the example x-ray inspection apparatus of FIG. 17 when a part carrier is lifted into an inspection area of the x-ray inspection apparatus, in accordance with a technique of this disclosure.

Carrier support members 1710 of a feed assembly position a part carrier 1712 to a location aligned with opening 1708. When part carrier 1712 is aligned with opening 1708, a drive assembly 1714 may lift part carrier 1712 off carrier support members 1710. FIG. 18 is a block diagram illustrating the example x-ray inspection apparatus of FIG. 17 when a part carrier is lifted into an inspection area of the x-ray inspection apparatus, in accordance with a technique of this disclosure. As shown in the example of FIG. 18, drive assembly 1714 may lift part carrier 1712 such that an object 1716 carried by part carrier 1712 is positioned between x-ray source 1702 and x-ray detector 1704.

Part carrier 1712 may include a radiological shielding material. When part carrier 1712 is raised in the manner shown in FIG. 18, part carrier 1712 may close opening 1708, thereby preventing x-rays from escaping radiological shield 1706 while object 1716 is being inspected. Thus, apparatus 1700 may include a radiological shield 1706 enclosing x-ray source 1702 and x-ray detector 1704, the radiological shield defining an opening, wherein when drive assembly 1714 lifts part carrier 1712, object 1716 passes through the opening and part carrier 1712 blocks the opening to substantially prevent emission of x-rays into an environment outside x-ray inspection apparatus 1700.

Subsequently, drive assembly 1714 may lower part carrier 1712 such that part carrier 1712 again rests on carrier support members 1710 of the feed assembly. The feed assembly may then move part carrier 1712 away, may align another part carrier with opening 1708, and may repeat the process.

In some examples, x-ray source 1702 is equipped with a tube shutter, such as that shown in the example of FIG. 1. The tube shutter blocks x-rays from escaping x-ray source 1702 while part carriers are not blocking opening 1708. In this disclosure, discussion of an object blocking x-rays may refer to completely or partially attenuating the x-rays. For instance, the object may attenuate the x-rays to the degree that x-rays passing through the object are not at a level potentially harmful to humans. In this way, x-ray source 1702 may be able to remain in a powered on mode while apparatus 1700 is not capturing radiographs.

In an alternative version of the example of FIGS. 17 and 18, part carriers include support members and shield members. In some examples, the support member of a part carrier and the shield member of the part carrier form a right angle to one another. Thus, the support member may be oriented horizontally and the shield member may be oriented vertically. In other examples, the support member and the shield member may be differently arranged. The support member of the part carrier supports the object being inspected. The shield member includes a radiological shielding material. In this example, drive assembly 1714 may move the support members of such part carriers horizontally through an opening in the radiological shield of the apparatus. When an object mounted on a part carrier is in place between the x-ray source and the x-ray detector, the shield member of the part carrier is flush with the radiological shield of the apparatus, thereby preventing substantial emissions of x-rays from the apparatus into the surrounding environment.

Figure 19:
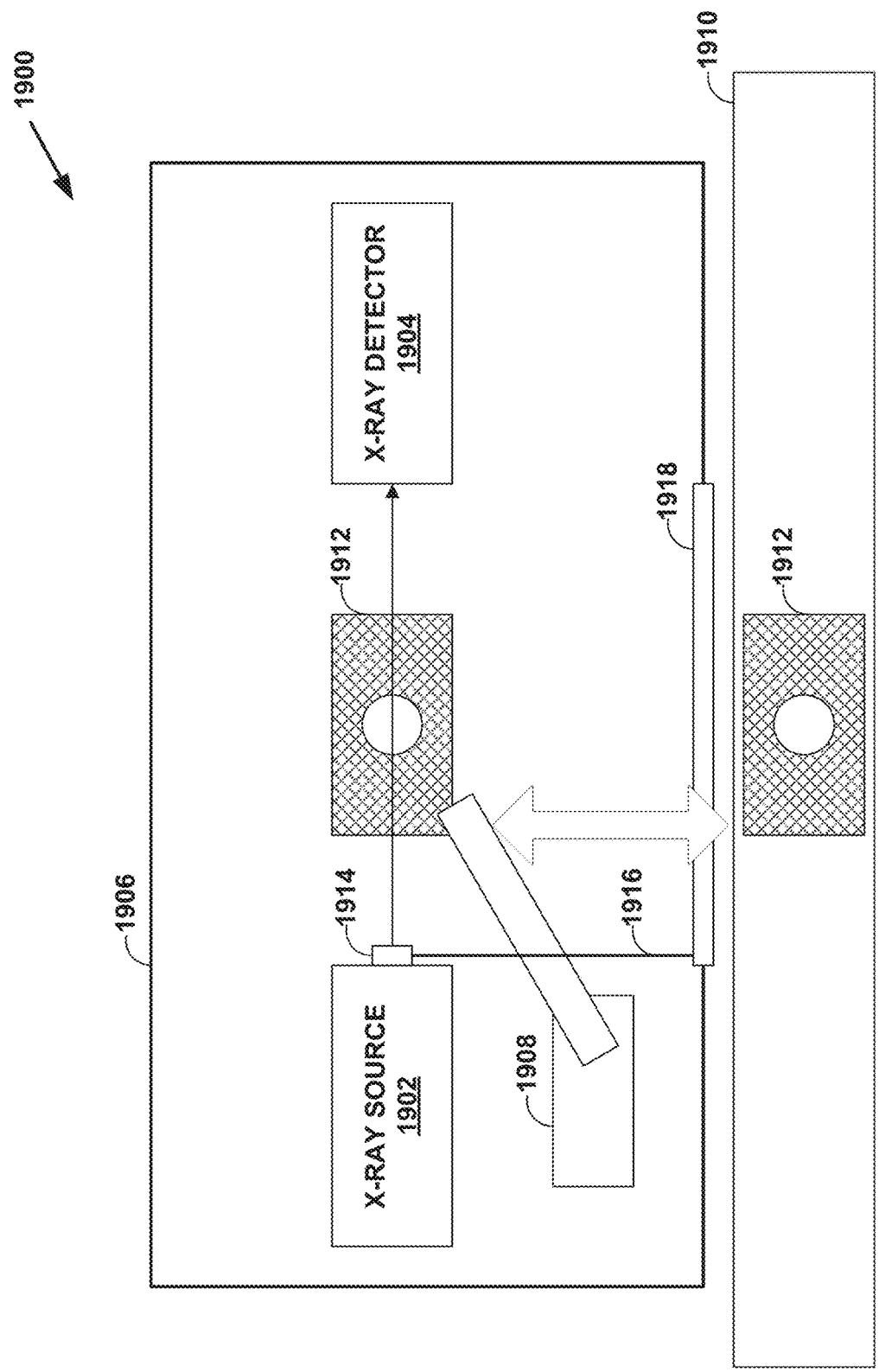
FIG. 19 is a block diagram illustrating an example x-ray inspection apparatus, in accordance with a technique of this disclosure.

FIG. 19 is a block diagram illustrating an example x-ray inspection apparatus 1900, in accordance with a technique of this disclosure. In the example of FIG. 19, apparatus 1900 includes an x-ray source 1902 and an x-ray detector 1904, enclosed by a radiological shield 1906. Radiological shield 1906 also encloses a robotic feed assembly 1908. X-ray source 1902 and x-ray detector 1904 may be similar in type and function to x-ray source 102 and x-ray detector 104.

A feed assembly 1910 conveys part carriers to a position aligned with an opening defined in radiological shield 1906. When feed assembly 1910 positions a part carrier (e.g., part carrier 1912) such that the part carrier is aligned with the opening, robotic feed assembly 1908 conveys the part carrier through the opening and positions the part carrier at an inspection area of apparatus 1900 between x-ray source 1902 and x-ray detector 1904. A door 1918 is configured to cover the opening in radiological shield 1906 while apparatus 1900 is capturing radiographs of an object mounted on the part carrier. Subsequently, door 1918 may reopen and robotic feed assembly 1908 may convey the part carrier back onto feed assembly 1910.

Thus, apparatus 1900 may be an x-ray inspection apparatus comprising an x-ray source, an x-ray detector, a robotic feed assembly, and a radiological shield enclosing the x-ray source, the x-ray detector, and the robotic feed assembly. In this example, the radiological shield defines an opening. The x-ray inspection apparatus further comprises a door configured to selectively cover and uncover the opening. The robotic feed assembly is configured to move a part carrier from a feed assembly, through the opening, and to a position between the x-ray source and the x-ray detector. An object to be inspected is mounted on the part carrier. The robotic feed assembly is further configured to subsequently move the part carrier back through the opening to the feed assembly.

In some examples, x-ray source 1902 is equipped with a tube shutter 1914, such as that shown in the example of FIG. 1. The tube shutter blocks x-rays from escaping x-ray source 1902 while door 1918 is open. In this way, x-ray source 1902 may be able to remain in a powered on mode while apparatus 1900 is not capturing radiographs. Apparatus 1900 may further comprise a mechanical coupling assembly 1916 between tube shutter 1914 and door 1918 such that tube shutter 1914 blocks x-rays emitted by x-ray source 1902 when door 1918 is open and does not block x-rays emitted by x-ray source 1902 when door 1918 is closed.

Thus, in such examples, apparatus 1900 may include a shutter coupled to the x-ray source, the shutter configured to block x-rays emitted by the x-ray source while the feed assembly is moving the part carrier. Apparatus 1900 may also include a mechanical coupling assembly between the shutter and the door such that the shutter blocks x-rays emitted by the x-ray source when the door is open and does not block x-rays emitted by the x-ray source when the door is closed.

Figure 20:
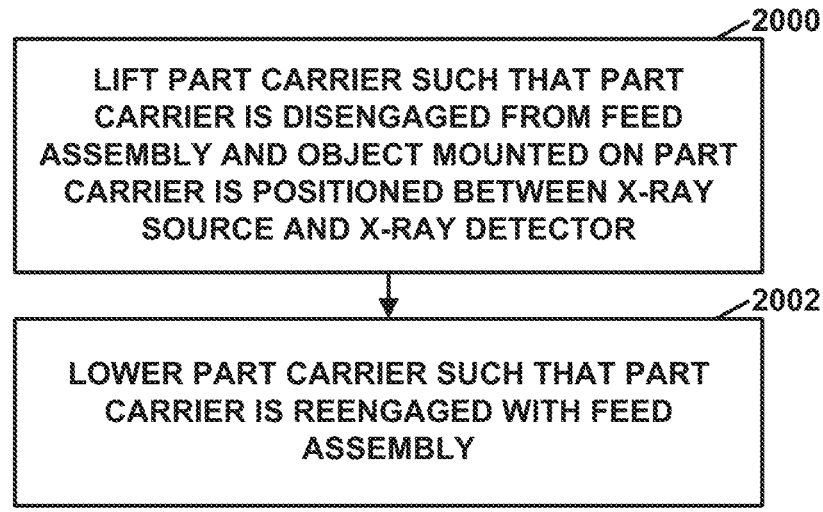
FIG. 20 is a flowchart illustrating an example operation of an x-ray inspection apparatus, in accordance with a technique of this disclosure.

FIG. 20 is a flowchart illustrating an example operation of an x-ray inspection apparatus, in accordance with a technique of this disclosure. The example operation of FIG. 20 may be performed by x-ray inspection apparatus 100 illustrated in the examples of FIGS. 1-16. In the example of FIG. 20, a drive assembly (e.g., drive assembly 122) may lift a part carrier (e.g., part carrier 110) such that the part carrier is disengaged from a feed assembly and an object (e.g., object 116) mounted on the part carrier is positioned between an x-ray source (e.g., x-ray source 102) and an x-ray detector (e.g., x-ray detector 104). The feed assembly is configured to feed part carriers into and out of an x-ray inspection apparatus comprising the x-ray source and the x-ray detector (2000). Furthermore, in the example of FIG. 20, the drive assembly may subsequently lower the part carrier such that the part carrier is reengaged with the feed assembly (2002).

Figure 21:
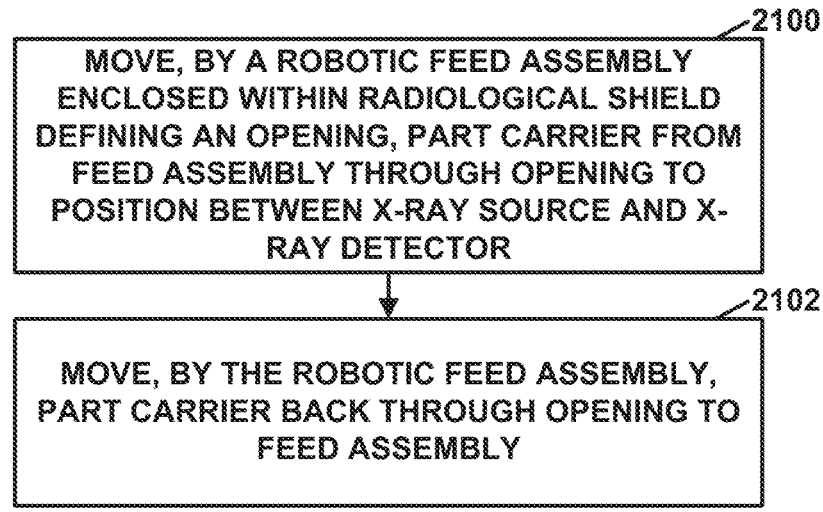
FIG. 21 is a flowchart illustrating an example operation of an x-ray inspection apparatus, in accordance with a technique of this disclosure.

FIG. 21 is a flowchart illustrating an example operation of an x-ray inspection apparatus, in accordance with a technique of this disclosure. The example operation of FIG. 21 may be performed by x-ray inspection apparatus 1900 illustrated in the example of FIG. 19. In the example of FIG. 21, a robotic feed assembly (e.g., robotic feed assembly 1908) enclosed within a radiological shield (e.g., radiological shield 1906) defining an opening, may move a part carrier (e.g., part carrier 1912) from a feed assembly (e.g., feed assembly 1910), through the opening, and to a position between an x-ray source (e.g., x-ray source 1902) enclosed within the radiological shield and an x-ray detector (e.g., x-ray detector 1904) enclosed within the radiological shield (2100). In the example of FIG. 21, an object to be inspected may be mounted on the part carrier. Subsequently, the robotic feed assembly may move the part carrier back through the opening to the feed assembly (2102).

In some examples consistent with the operation of FIG. 21, a door selectively covers or uncovers the opening defined in the radiological shield. When the door covers the opening, the door blocks x-rays from exiting the x-ray inspection apparatus through the opening defined in the radiological shield. Furthermore, a mechanical coupling assembly between the door and a shutter coupled to the x-ray source may open and close the shutter such that the shutter blocks x-rays emitted by the x-ray source when the door is open and does not block x-rays emitted by the x-ray source when the door is closed.

Various examples have been described. These and other examples are within the scope of the following claims.

The invention claimed is:

1. An x-ray imaging apparatus comprising:
    an x-ray source;
    an x-ray detector;
    a base that is mechanically coupled to the x-ray source and the x-ray detector;
    one or more vibration isolators, the one or more vibration isolators being mechanically coupled to the base, wherein the one or more vibration isolators are configured to vibrationally isolate the x-ray source and the x-ray detector from a feed assembly;
    a radiological shield enclosing the x-ray source and the x-ray detector, the radiological shield defining an opening; and
    a drive assembly configured to:
        position a part carrier such that the part carrier is disengaged from the feed assembly and an object mounted on the part carrier is positioned between the x-ray source and the x-ray detector, wherein the part carrier is configured to feed the object into and out of the x-ray imaging apparatus; and
        subsequently position the part carrier such that the part carrier is reengaged with the feed assembly,
    wherein when the drive assembly positions the part carrier, the object passes through the opening and the part carrier blocks the opening to substantially prevent emission of x-rays into an environment outside the x-ray imaging apparatus.

2. The x-ray imaging apparatus of claim 1, wherein the one or more vibration isolators are further configured to vibrationally isolate the drive assembly from the feed assembly.

3. The x-ray imaging apparatus of claim 1, further comprising:
    a door that is configured to substantially prevent emission of x-rays into the environment outside the x-ray imaging apparatus when the object is positioned between the x-ray source and the x-ray detector when the door is closed.

4. The x-ray imaging apparatus of claim 3, further comprising:

a shutter that is configured to substantially prevent emission of x-rays into the environment outside the x-ray imaging apparatus when the door is opened.

5. The x-ray imaging apparatus of claim 1, wherein the base comprises granite.

6. The x-ray imaging apparatus of claim 1, wherein the one or more vibration isolators comprise at least one of rubber or gel.

7. The x-ray imaging apparatus of claim 1, further comprising:
at least one horizontal translation drive configured to move at least one of the x-ray source or the x-ray detector in a horizontal direction.

8. The x-ray imaging apparatus of claim 1, further comprising:
a temperature control device configured to control a temperature in the x-ray imaging apparatus.

9. A method comprising:
positioning a part carrier, via a drive assembly, such that the part carrier is disengaged from a feed assembly and an object mounted on the part carrier is positioned between an x-ray source and an x-ray detector, wherein the part carrier is configured to feed the object into and out of an x-ray imaging apparatus;
radiologically shielding, with a radiological shield, the x-ray source and the x-ray detector, wherein the radiological shield defines an opening; and
subsequently positioning the part carrier, by the drive assembly, such that the part carrier is reengaged with the feed assembly,
wherein the x-ray source and the x-ray detector are vibrationally isolated from the feed assembly and wherein when the drive assembly positions the part carrier, the object passes through the opening and the part carrier blocks the opening to substantially prevent emission of x-rays into an environment outside the x-ray imaging apparatus.

10. The method of claim 9, wherein the drive assembly is vibrationally isolated from the feed assembly.

11. The method of claim 9, further comprising:
closing a door, the door being configured to substantially prevent emission of x-rays into the environment outside the x-ray imaging apparatus when the object is positioned between the x-ray source and the x-ray detector when the door is closed.

12. The method of claim 11, further comprising:
opening the door; and
closing a shutter, the shutter being configured to substantially prevent emission of x-rays into the environment outside the x-ray imaging apparatus when the door is opened.

13. The method of claim 9, wherein the x-ray source and x-ray detector are mechanically coupled to a base that comprises granite.

14. The method of claim 9, wherein the base is mechanically coupled to one or more vibration isolators, and wherein the one or more vibration isolators comprise at least one of rubber or gel.

15. The method of claim 9, further comprising:
moving, via at least one horizontal translation drive, at least one of the x-ray source or the x-ray detector in a horizontal direction.

16. The method of claim 9, further comprising:
controlling a temperature, via a temperature control device, in an x-ray imaging apparatus.

* * * * *